United States Patent
Yaacov et al.

(10) Patent No.: US 11,556,484 B2
(45) Date of Patent: Jan. 17, 2023

(54) MINIMIZING ENERGY CONSUMPTION BY PERIPHERAL MACHINES

(71) Applicant: Ecoplant Technological Innovation LTD, Modiln (IL)

(72) Inventors: Aviran Yaacov, Modiln (IL); Yaron Harel, Tel Aviv (IL); Mordechai Yaakov, Modiln (IL)

(73) Assignee: Ecoplant Technological Innovation LTD, Modiln (IL)

( * ) Notice: Subject to any disclaimer, the term of this patent is extended or adjusted under 35 U.S.C. 154(b) by 0 days.

(21) Appl. No.: 17/408,536

(22) Filed: Aug. 23, 2021

(65) Prior Publication Data

US 2022/0075739 A1 Mar. 10, 2022

Related U.S. Application Data

(63) Continuation of application No. 16/758,424, filed as application No. PCT/IL2018/051140 on Oct. 24, 2018, now Pat. No. 11,100,012.

(30) Foreign Application Priority Data

Oct. 24, 2017 (IL) .......................................... 255242

(51) Int. Cl.
*G06F 13/10* (2006.01)
*G06N 20/00* (2019.01)

(52) U.S. Cl.
CPC ............. *G06F 13/10* (2013.01); *G06N 20/00* (2019.01)

(58) Field of Classification Search
CPC ................................ G06F 13/10; G06N 20/00
See application file for complete search history.

(56) References Cited

U.S. PATENT DOCUMENTS

| | | | |
|---|---|---|---|
| 10,942,492 B2* | 3/2021 | Lassen | G05B 13/024 |
| 2004/0186927 A1* | 9/2004 | Eryurek | G05B 23/0278 710/13 |
| 2016/0147242 A1* | 5/2016 | Kaufman | G05B 15/02 700/291 |
| 2017/0359418 A1* | 12/2017 | Sustaeta | G05B 13/024 |

* cited by examiner

*Primary Examiner* — Henry Tsai
*Assistant Examiner* — Christopher A Daley

(57) ABSTRACT

A method of applying feedback control on peripheral units supplying energy to manufacturing units in a manufacturing facility uses a trained model, and includes:
  mapping supply relations between peripheral units and manufacturing units into a schema;
  establishing communications with sensors monitoring peripheral unit metrics indicative of energy transfer from the peripheral units to the manufacturing units;
  training the model based on the schema and training data gathered by communication with the sensors during a training period, the trained model predicting energy usage by the peripheral machines with a specified degree of accuracy; and
  during a control period following the training period, gathering further data from the sensors and minimizing energy usage by the peripheral units while supplying the total energy demanded by the manufacturing units by controlling at least one of the peripheral units based on an outcome of inputting the further data into the trained model.

20 Claims, 12 Drawing Sheets

MINIMIZING ENERGY CONSUMPTION BY PERIPHERAL MACHINES

RELATED APPLICATIONS

This application is a continuation of U.S. patent application Ser. No. 16/758,424 filed on Apr. 23, 2020, which is a National Phase of PCT Patent Application No. PCT/IL2018/051140 having International Filing Date of Oct. 24, 2018, which claims the benefit of priority of Israel Patent Application No. 255242 filed on Oct. 24, 2017. The contents of the above applications are all incorporated by reference as if fully set forth herein in their entirety.

FIELD AND BACKGROUND OF THE INVENTION

The present invention, in some embodiments thereof, relates to a system for controlling machines in a manufacturing facility and, more specifically, but not exclusively, to monitoring and controlling peripheral machines supplying mechanical energy to manufacturing machines in a manufacturing facility.

Industrial control systems are often using in manufacturing facilities to control systems and machines involved in the manufacturing process. Such systems typically process sensor data and derive commands to set the operation parameters of these machines. Industrial control systems are often implemented supervisory control and data acquisition (SCADA) systems, distributed control systems (DCS) or programmable logic controllers (PLCs).

Existing industrial control solutions are custom-made for each factory. These custom-made solutions are often made by experts with both in planning solutions and programming such a solution, tailored to the factory. Examples of such solutions includes:

i) Conducting energy surveys by temporarily plugging measurement equipment into key machines/areas in the factory;

ii) Selecting optimal (e.g. energy-wise) machines that meet demand;

iii) Designing the order of operation of the factory machines (e.g. which machine starts to work first when greater production is required);

iv) Finding issues in the production pipeline that cause energy-loss (e.g., leakages):

v) Predicting upcoming failures in machines and alerting that maintenance is required.

For designing and implementing such solutions, the designer must have specialized knowledge of the manufacturing process, demands, machines (e.g. capabilities, inputs/outputs, maintenance requirements, power requirements, etc.). Accurate and complete knowledge of all these aspects of the manufacturing facility is difficult if not impossible to achieve. Furthermore, changes in the manufacturing or supply process, the addition or replacement of machines and any other changes will require reevaluation and updating of the planning solution. Without this updating, changes in the manufacturing facility may result in diminished performance and inefficient usage of resources.

SUMMARY OF THE INVENTION

Embodiments described herein apply machine learning and other techniques to data provided by sensors monitoring machines in a manufacturing facility. Data is gathered from the sensors during a training period and used to train a model. The model reflects how specified goals are affected by changes in values measured by the sensors. The model may also be based on other information, such as a schema of the facility. The schema maps connections between physical objects in the facility, such as peripheral machines, manufacturing machines, pipelines, valves, sensors, etc. A communication network is used to convey data between the control system and the sensors and controls for the peripheral machines.

After the training period, the model serves as a basis for a control system, which performs real-time control of the peripheral machines. The control system maximizes efficiency of energy consumption by the peripheral machines, while ensuring that all the energy needed by the manufacturing machines is supplied by the peripheral machines. In other words, the primary goal of the control system is to minimize energy consumption by the peripheral machines while satisfying the primary constraint that the energy demand by the manufacturing machines is met.

Embodiments of the invention may be designed to control:

i) A group of peripheral machines supplying mechanical energy only (optionally multiple types of mechanical energy such as heating, cooling, air pressure, fluid flow, etc.);

ii) A group of peripheral machines supplying electrical energy only (e.g. electrical generators generating electrical current); and iii) A group of peripheral machines supplying both mechanical and electrical energy.

In some cases, the peripheral machines may not be able to supply all the energy needed by the manufacturing machines, for example due to malfunction of a peripheral machine, peripheral machine offline for maintenance, and other reasons. Optionally, in such cases the control system selects control settings, which achieve an energy supply closest to the primary goal. For example, if the primary goal is a minimum capacity of 1,000 L/h and too many air compressors are offline due to power failure, the control system will select the control settings that give the highest capacity (e.g. 900 L/h).

Data continues to be gathered from the sensors during the control period. The control system inputs this data into the model analyzes the results and identifies optimal control settings for the peripheral machines. Optionally, the model is updated automatically after the training period, based on sensor data collected during real-time operation and/or during a dedicated retraining period.

Because the model is built automatically from the sensor data, the control system may be built without specialized knowledge of the manufacturing facility and manufacturing process. This is a significant benefit over tailor-made solutions, which require specialized knowledge, dedicated programming and are difficult to keep current with changes in the manufacturing facility.

The control system described herein additional benefits, including but not limited to:

i) Immediate notification of alerts and machines failures;

ii) Anomaly detection and predictive maintenance (e.g. when actual performance diverges from the model's predictions);

iii) Reducing manual-labor to control/adjust the peripheral machines;

iv) Reducing/eliminating the need for an expert solution designer design the control system and to revisit the factory every certain period to adjust the machines;

v) Meeting regulatory requirements in some countries for a control system with 24/7 monitoring; and vi) May be implemented with standard off-the-shelf sensors and/or with minimal hardware installation on the peripheral machines (for example, adding communication interfaces to peripheral machines which do not have built-in communication capabilities).

The control system may be implemented in a remote server (e.g. a Cloud server) and/or a local (e.g. on-premise) server.

As used herein the terms "manufacturing facility", "facility" and "factory" mean a set of interconnected machines operating together to perform a manufacturing function (e.g. producing a product).

As used, herein the terms "peripheral machine" and "peripheral unit" mean a unit of equipment in the facility that supplies energy to support the manufacturing machines. The supplied energy may be mechanical and/or electrical, depending on the properties of the peripheral machine. Examples of peripheral machines include but are not limited to: air compressor, chiller, vacuum pumps, blowers, dryers and electric generators.

As used herein the terms "manufacturing machine" and "manufacturing unit" means a machine, which consumes energy supplied by the peripheral machines. Examples of manufacturing machines include but are not limited to: conveyer belt, air drill and suction gripper.

As used, herein the term "physical object" means any physical element in the supply side of the facility that may be connected directly or indirectly to the control system, in order to provide data to the control system and/or receive control commands from the control system.

As used herein the term "supply side" means equipment in the facility which together supply energy to manufacturing machines and equipment on the "demand side" of the facility. The distinction between which machines and equipment are supply side equipment and which are demand side equipment is implementation-based and may vary between different manufacturing facilities.

According to a first aspect of some embodiments of the present invention there is provided a method of applying feedback control on peripheral units in a manufacturing facility. The method includes:
mapping supply relations between multiple peripheral units and multiple manufacturing units of the manufacturing facility into a schema, the plurality of peripheral units supplying energy to the plurality of manufacturing units;
establishing communications with multiple sensors monitoring metrics of respective peripheral units, wherein the metrics are indicative of energy transfer from the plurality of peripheral units to the plurality of manufacturing units;
training a model based on the schema and training data gathered by communication with the plurality of sensors during a training period, the trained model predicting energy usage by the peripheral units with a specified degree of accuracy; and
during a control period following the training period:
gathering further data from the plurality of sensors; and
minimizing the energy usage by the peripheral units while supplying a total energy demanded by the manufacturing units by controlling at least one of the plurality of peripheral units based on an outcome of inputting the further data into the trained model.

According to a second aspect of some embodiments of the present invention there is provided a system for applying feedback control on peripheral units in a manufacturing facility, comprising:
multiple sensors located to monitor metrics of respective peripheral units, wherein the metrics are indicative of energy transfer from the peripheral units to multiple manufacturing units in the facility;
at least one network interface adapted to communicate with the sensors and controllable ones of the peripheral units; and
at least one processor associated with the plurality of sensors and the at least one network interface, adapted to:
map supply relations between the peripheral units and the plurality of manufacturing units into a schema, the peripheral units supplying energy to the plurality of manufacturing units;
establish communication with the sensors via the network interface;
train a model based on the schema and training data gathered by communication with the plurality of sensors during a training period, the trained model predicting energy usage by the peripheral units with a specified degree of accuracy; and
during a control period following the training period:
gather further data from the plurality of sensors; and
minimize the energy usage by the peripheral units while supplying a total energy demanded by the manufacturing units by controlling at least one of the controllable peripheral units based on an outcome of inputting the further data into the trained model.

In a first possible implementation of the first aspect or the second aspect, when the peripheral units are incapable of supplying the total energy demanded by the manufacturing units, the peripheral units are controlled to maximize energy supplied by the peripheral units to the manufacturing units.

In a second possible implementation of the first aspect or the second aspect, the energy is mechanical energy.

In a third possible implementation of the first aspect or the second aspect, the energy is electrical energy.

In a fourth possible implementation of the first aspect or the second aspect, the energy is mechanical energy and electrical energy.

In a fifth possible implementation of the first aspect or the second aspect, at least one of sensors monitors a metric of a conduit connected to an output of the respective peripheral unit.

In a sixth possible implementation of the first aspect or the second aspect, training a model includes building the model by:
dividing the peripheral units into object sets;
generating a respective model for each of the object sets; and
combining the respective models for the objects sets into a single model, which includes all of the peripheral units.

In a seventh possible implementation of the first aspect or the second aspect, the model is a recurrent neural network with long-short term memory.

In an eighth possible implementation of the first aspect or the second aspect, controlling at least one of the controllable peripheral units includes performing control system runs, where each of the control system runs includes:
inputting metric values from the sensors;
inputting the metric values into the model; and
selecting control settings for controllable ones of the peripheral units so as to minimizing the energy usage by the peripheral units.

In a ninth possible implementation of the first aspect or the second aspect, the minimum duration between control system runs is two minutes.

In a tenth possible implementation of the first aspect or the second aspect, a new control system run is performed when the peripheral units cease supplying the total energy demanded by the manufacturing units.

In an eleventh possible implementation of the first aspect or the second aspect, the control settings are further selected to prevent violation of at least one constraint based on a metric value.

In a twelfth possible implementation of the first aspect or the second aspect, a new control system run is performed when at least one of the specified constraints is violated by a current metric value.

In a thirteenth possible implementation of the first aspect or the second aspect, controlling at least one of the controllable peripheral units includes performing control system runs, where each of the control system runs includes:
 generating all valid combinations of peripheral units, wherein a valid combination comprises a set of peripheral units capable of supplying the total energy demanded by the manufacturing units while meeting specified constraints on metric values;
 generate all possible set plans for each of the combinations, each of the set plans specifying different respective control settings for control parameters of controllable peripheral units in the combination;
 identify all set plans which meet the specified constraints; and
 select, from the identified set plans, a set plan minimizing the energy usage by the peripheral units.

In a fourteenth possible implementation of the first aspect or the second aspect, the control parameters of the controllable peripheral units are set to the specified control settings of the set plan minimizing the energy usage by the peripheral units.

In a fifteenth possible implementation of the first aspect or the second aspect, the minimum duration of the training period is one week.

In a sixteenth possible implementation of the first aspect or the second aspect, the model is initialized with manufacturer specification data prior to the training.

In a seventeenth possible implementation of the first aspect or the second aspect, the peripheral units include at least one of: an air compressor, a chiller, a vacuum pump, a filter, a dryer, a heater and an electric generator.

According to a third, aspect of some embodiments of the present invention there is provided a system for managing the optimization of energy efficiency of peripheral machines in a manufacturing facility, comprising:
 a) a monitoring unit for measuring peripheral machines through external sensors thereby understanding the efficiency of the peripheral machines; and
 b) a proactive engine unit for operation optimizing and predicting the maintenance of peripheral machines.

In a possible implementation of the first aspect, the monitoring layer comprises an add-on smart device, which is added to one or more machines; the smart device comprises:
 a) a sampling module which samples the data and stores the data in a cloud when internet is available; the sampling module enables two-way communications between the smart device and a peripheral machine, for receiving data from the machine and inserting command to the machine from the smart device;
 b) a device to device communications module, which securely connect to other smart devices creating a network of smart devices, to allow "offline mode" communications, when internet is not available, and allow operation between peripheral machines on the local network of smart devices;
 c) a smart device light proactive engine which makes a locally optimal choice at each stage of a problem in order to find an optimum using IF/else algorithm and allows operation of devices when Internet is not connected; the light proactive engine is shared across the smart devices in the local network of smart devices and is based on a greedy algorithm.

In a possible implementation of the first aspect, the device to device communications module works by identifying all the valid smart devices on the local network of smart devices and opening a two-way communications channel with the valid smart devices, in a way that one smart device can request information on a connected machine from another smart device, and send to the other smart device a command to be inserted to the connected machine.

In a possible implementation of the first aspect, the light engine handles alerts, 7 that requires to identify when to restart the light engine on the basis of dynamic alerts and to examine changes that affect energy consumption by the peripheral machines and to provide the most appropriate and effective solutions.

In a possible implementation of the third aspect, in the network of smart devices one smart device is automatically selected to be a Central Smart Device (CSD), which orchestrates the operation of the rest of the smart devices by distributing between the smart devices in the network component work, calculation and an operation plan, and wherein the CSD is suitable to connect to cloud service.

In a possible implementation of the third aspect, the proactive engine comprises:
 a) a plan processor which receives the collected data from the monitoring layer, runs models on how to effectively operate peripheral machines, with better maintenance and produce a set of instructions that are sent to Smart Device; and
 b) a modeler, which contains different models that receive data from the Plan Processor, and generates a relevant outcome for the Plan Processor.

In a possible implementation of the third aspect, the plan processor comprises:
 a) an output needs predictor, which determines in real-time or at every predetermined time interval what is the output needed from a production line;
 b) an efficiency examiner component, which calculates the efficiency of every monitored machine and the total efficiency of the system, taking into account non-direct parameters; wherein the calculations are sent to the operation plan modeler and wherein in cases of a predetermined threshold change in efficiency, a re-evaluation of an operation plan is triggered;
 c) a non-leading Key Performance Indicators (KPI) optimizer, which suggests changing parameters of monitored machines to optimize non-leading KPIs (i.e. secondary goals and/or constraints) as long as leading KPIs (i.e. primary goals and/or constraints) are not hurt;
 d) a malfunction predictor which predicts malfunction of monitored peripheral machines in real-time;
 e) an unmonitored machines modeler, which predicts unmonitored machines behavior for a predetermined time as a function of time and needed output level;
 f) an operation plan modeler, which receives all the predictions and generates an operation plan that meets the production needs and optimizes the efficiency, by taking into account non-leading KPIs and upcoming malfunctions; and g) an operation plan executer, which generates an execution plan for an object set of peripheral machines and executes the plan by transmitting a set of commands and rules to smart devices in the network.

According to a fourth aspect of some embodiments of the present invention there is provided a method for managing the optimization of energy efficiency of peripheral machines in a manufacturing facility, comprising the steps of:

a) monitoring and measuring peripheral machines through external sensors thereby understanding the efficiency of the peripheral machines;

b) optimizing an operation plan and predicting maintenance of peripheral machines by connecting to a peripheral machine and connecting to a general system of a manufacturing facility to learn a real-time production line needs; and thereby to pinpoint the malfunctions, to assess the waste of energy and to recommend possible fixes.

In a possible implementation of the fourth aspect, the step of optimizing an operation plan and predicting maintenance of peripheral machines, comprises the steps of:

a) predicting output needs of a production line in real-time or every predetermined time interval by connecting to a general system of the manufacturing facility and connecting to the peripheral machines using a recurrent neural network model of The Long Short-Term Memory network; wherein the prediction is sent to an operation plan modeler;

b) examining and calculating the efficiency of every connected machine and a total efficiency of the production line, taking into account non-direct parameters; wherein the calculations are sent to the operation plan modeler and wherein in cases of a predetermined threshold change in efficiency, a re-evaluation of an operation plan is triggered;

c) optimizing non-leading KPIs parameters as long as leading KPIs are not affected, using a neural network model with predefined values for weights and suggesting changes of parameters of monitored machines to the operation plan modeler;

d) predicting malfunctions of monitored machines in real-time using a recurrent neural network model with Long Short Term Memory network; wherein the prediction is sent to the operation plan modeler and triggers a re-evaluation plan based on upcoming machine malfunctions;

e) predicting unmonitored machines behavior for a predetermined time as a function of time and needed output level; wherein the prediction of unmonitored machines behavior is sent to the operation plan modeler;

f) receiving all the predictions by an operation plan modeler and generating an operation plan which meets the production needs and optimizes the efficiency by taking into account non-leading KPIs and upcoming malfunctions; and g) generating an execution plan for an object set of peripheral machines and executing the plan by transmitting a set of commands and rules to smart devices in the network.

In a possible implementation of the fourth aspect, generating an operation plan comprises the steps of:

a) iteratively checking which machine among all possible options, supplies the output needed to meet production needs to find a best plan, and generating a set of possible plans;

b) receiving the set of possible plans and examining each possibility according to operational parameters efficiency, and/or creating a sub-option with different operational parameters; wherein a set of x option is generated, where x is the difference between a leading option that has the best efficiency and an option with 10% less efficiency than the leading option;

c) receiving the set of x options and examining each of the options according to non-leading KPIs objectives; wherein one of the options that meets more objectives is selected;

d) organizing the selected option of operation plan by creating actual immediate commands and rules for the next predetermined minutes of operation and downloading the commands to the smart devices, which send the commands to the machines and sensors.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
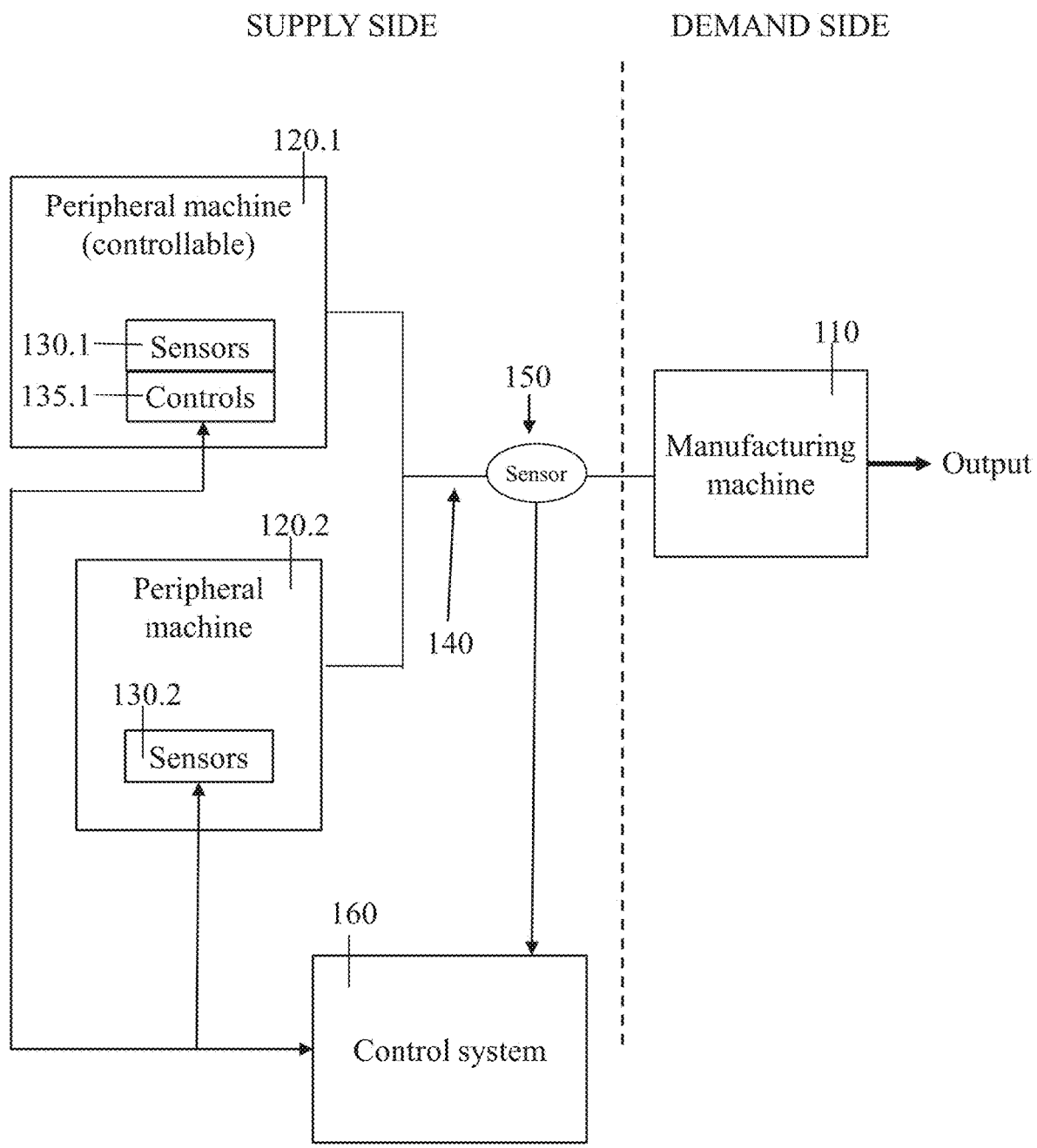
FIG. 1 is a simplified block diagram of a manufacturing facility according to an exemplary embodiment of the invention.

The present invention, in some embodiments thereof, relates to a system for controlling machines in a manufacturing facility and, more specifically, but not exclusively, to monitoring and controlling peripheral machines supplying mechanical energy to manufacturing machines in a manufacturing facility.

The control method and system described builds, trains and uses a model to control peripheral machines in a manufacturing facility. The peripheral machines supply energy to the manufacturing machines. The control system sets control parameters for controllable peripheral machines, in order to meet (and/or optimize) specified goals while remaining within established constraints.

Interaction between the peripheral machines and manufacturing machines is based on physical connections (also denoted herein conduits) which enable the peripheral machines to supply energy to the manufacturing machines. At least one control setting of one of the peripheral machines is remotely controlled by the control system.

As used herein the term "electric energy" energy which is supplied by the flow of electrical current.

As used, herein the term "mechanical energy" means any form of energy, which powers the manufacturing machines and is not electrical energy. The term "mechanical energy" is not limiting to potential and kinetic energies, and is intended to encompass other non-electrical forms of energy such as heat and magnetic energy. Examples of types of mechanical energy that may be supplied by peripheral machines include but are not limited to: compressed air (e.g. to raise or lower a conveyer belt) and cooled water (e.g. to cool down a computer numerical control machining process).

As used, herein the term "control setting" means the value of an operating parameter of a peripheral machine, which may be set by the control system.

Sensors monitor metrics of the peripheral machines and/or conduits between the machines during operation. Optionally, other sensors monitor the peripheral machine operating conditions (e.g. ambient temperature, humidity, oil pressure, current, power, voltage, etc.). The sensor data is provided over a communication network to the control system. Examples of metrics which may be measured by the sensors include but are not limited to: temperature, pressure, volume and power.

As used herein the term "metric" is a measurement of a specific parameter of a specific peripheral machine or part of a conduit (for example on pipelines between air compressors and manufacturing machines). Typically, the metric is a magnitude value with an associated unit (e.g. 5 psi, where 5 is the magnitude and psi is the unit).

Optionally, metrics are also measured for other types of physical objects.

Although different sensors may measure the same parameter on the same type of peripheral machine, each sensor is considered to be measuring a different metric. For example, metric A may be the pressure measured by a first pressure sensor at the output of a first air compressor while metric B is the pressure measured by a different pressure sensor at the output of a second air compressor, even if the air compressors, sensors and the locations of the sensors on the air compressors are identical.

As used herein the term "metric value" or "value" means the magnitude of the metric when sampled by the associated sensor.

Reference is now made to FIG. 1, which is a simplified block diagram of a manufacturing facility according to an exemplary embodiment of the invention. FIG. 1 illustrates a non-limiting simple example in which facility 100 includes two peripheral machines 120.1-120.2 supplying energy to a single manufacturing machine 110. The outputs of the two peripheral machines are combined (possibly via a separate element, not shown) into a common conduit 140 leading to manufacturing machine 110. Sensors 130.1 and 130.2 monitor peripheral machines 120.1-120.2 respectively, and sensor 150 monitors conduit 140. Sensors 130.1, 130.2 and 150 provide the values to control system 160. Control system 160 sends control commands and/or signals to controllable peripheral machines such as peripheral machine 120.1.

Setup

A setup stage may be required in order to prepare the facility for the control system. Some hardware and/or software adaptation may be required, including but not limited to:

1) Installing sensors to gather necessary metrics;
2) Adding communication capabilities to peripheral machines and/or existing sensors; and
3) Setting up a communication network enabling data transfer between the control system, sensors and peripheral machines.

Peripheral Machines

The peripheral machines supply mechanical and/or electrical energy, which supports the operation of the manufacturing machines. At least one of the peripheral machines has a control parameter, which may be set by the control system (such as on/off, setpoint temperature, maximum pressure, operation mode, etc.).

As used, herein the term "controllable peripheral machine" means a peripheral machine, which inputs control commands and/or signals from the control system and adjusts its operation according to the control commands and/or signals.

In order to produce the energy supplied to the manufacturing machines, the peripheral machines must themselves consume energy (e.g. an air compressor powered by electric current, an electric generator powered by diesel fuel, etc.).

As used herein the term "energy usage" means the energy consumed by the peripheral machines.

The types of peripheral machines (and other demand side equipment such as sensors) and their work regime differ from facility to facility. These differences include but are not limited to:
i) Machine type/size/brand/technology/age;
ii) Machine maintenance status;
iii) Pipeline length, diameter;
iv) Pipeline maintenance status (e.g. holes in pipes . . . );
v) Demand-side (production line) energy consumption and pattern; and
vi) Environmental parameters (temp, humidity, altitude).

Examples of peripheral machines include but are not limited to:
i) Air compressor;
ii) Chiller;
iii) Vacuum pump;
iv) Filter;
v) Dryer;
v) Heater; and
vi) Electric generator.

Each type of peripheral machine may have different metrics that are used in the model. Peripheral machines performing the same function may have different associated metrics. For example, an air compressor with an inverter may have a motor speed status metric instead of a Load/Unload status metric.

Typically, peripheral machines, sensors and other devices have manufacturer-provided specifications. Optionally, information from these specifications is used during development and/or operation of the control system.

Metrics

As discussed above, sensors measure metric values and provide these values to the control system during both training and regular operation. The metrics are indicative of energy transfer from the peripheral units to the manufacturing units. The term energy transfer not only includes conveying energy to the manufacturing machines but also remove excess energy from the manufacturing machines (e.g. using a chiller).

Goals are established for at least one of the metrics measured by the sensors. Optionally, the control system sets the peripheral machine control settings to levels, which meet and/or optimize these goal(s). Types of goals that may be set for a metric include but are not limited:
i) A specified value;
ii) Maximizing or minimizing the metric's value;
iii) Maintaining the metric's value within a given range;
iv) Minimizing deviations in the metric's value;
v) Sustaining a value for a specified minimum duration.

Optionally, one or more constraints are established for respective metrics. When constraints are established, the control system must also ensure that the peripheral machine control settings do not create conditions, which violate the constraints. Constraints provide required ranges, which must be maintained for one or more of the metrics during operation. For example, the constraints may require that at a certain location, the pressure must be above 7.3 bar and water temperature must be below 22 degrees Celsius.

Different types of metrics may be defined. The metric's type indicates how the metric is used by the control system. Types of metrics include but are not limited to:
i) Demand output metric—a metric that is used as a system goal or to calculate a system goal. For example, a volume sensor on a pipe leading to the manufacturing machines may be used as a demand output metric to calculate the system goal of maximizing volume
ii) Constraint output metric—a metric that has a constraint or is used to calculate a constraint. For example, a pressure sensor on a pipe leading to the manufacturing machines may be used as a constraint output metric in order to ensure that the constraint is maintained (e.g. the pressure does not rise above the maximum of 7.5 Bar
iii) Controllable metrics—indicates that the value of the metric may be controlled by the control system or other external interface (e.g. on/off, setpoint temperature, maximum pressure, operation mode, etc.). Optionally, a constraint may be set for a controllable metric (for example that a maximum pressure on an air compressor should not exceed 8.3 bar of pressure).
iv) Status metric—a metric that is used to indicate a status of the peripheral device or other physical device (e.g. on/off, load/unload, alert, malfunction, service needed, etc.). A status metric may or may not be controllable.

Optionally, a single metric may be of more than one type. For example, the metric value may be constrained to a specified range (i.e. constraint output metric) and when it is within that range it is used to calculate a system goal (i.e. demand output metric).

Sensors

Any suitable sensor may be used to measure a respective metric, provided it can be installed where it is needed and has communication capabilities, which enable the values measured by the sensor to be provided to the control system (e.g. pushed to or pulled by the control system).

Optionally, at least one of the sensors is an internal sensor of the peripheral machine.

Optionally, at least one of the sensors is an external sensor, which is installed on a peripheral machine or other physical object in order to gather data needed by the control system. If possible, an off-the-shelf sensor (such as CS Instruments VA570 Flow Sensor) may be used, with the potential benefit of cost savings and proven performance.

Optionally, at least one of the sensors is controllable, for example for recalibration. In this case, the sensor must have data reception capabilities in order to receive control commands or signals from the control system and/or external system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a device, a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
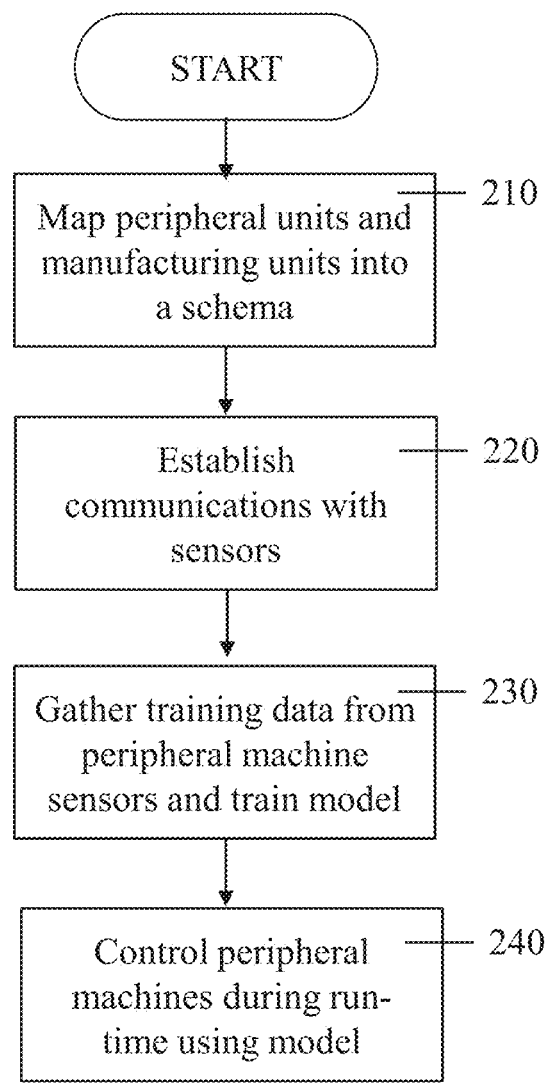
FIG. 2 is a simplified flowchart of a method of applying feedback control on peripheral units in a manufacturing facility, according to embodiments of the invention.

Reference is now made to FIG. 2, which is a simplified flowchart of a method of applying feedback control on peripheral units in a manufacturing facility, according to embodiments of the invention.

In 210 supply relations between peripheral units and manufacturing units are mapped into a schema. As discussed above, the peripheral units supply mechanical and/or electric energy to the manufacturing units. A valid schema must include at least one peripheral machine, one interconnection and one manufacturing machine. The schema may also include relations with other types of physical objects, which may be incorporated into the model and/or used by the control system.

The term "energy" used to describe embodiments herein is non-limiting as to the types of energy supplied by the peripheral machines. The peripheral machines may supply one or more types of mechanical energy and/or may include one or more sources of electrical energy.

Optional embodiments of the invention include:
i) Controlling peripheral machines, which supply one or more forms of mechanical energy, but not electrical energy;

ii) Controlling peripheral machines which supply only electrical energy; and
iii) Controlling peripheral machines, which supply both mechanical energy and electrical energy.

Optionally, the schema is represented as a linked list. Every physical object may have a one-direction pointer with no cycle (directed acylic graph) to zero or more other physical objects.

Optionally, the schema also incorporates additional information about the manufacturing facility including but not limited to:
i) Location of sensors in the manufacturing facility;
ii) The metrics collected by each of the sensors;
iii) Peripheral machine control settings (i.e. operational parameters) which may be controlled remotely;
iv) Goals for metric values;
v) Constraints on the metrics; and
vi) Status values.

Typically, the number, type and interconnections of the machines, sensors and controls in a facility is much more complex than the facility illustrated in FIG. 1. Embodiments of the invention are easily implemented in larger and much more complex manufacturing facilities, simply by building a schema, which represents the specific facility.

Figure 3:
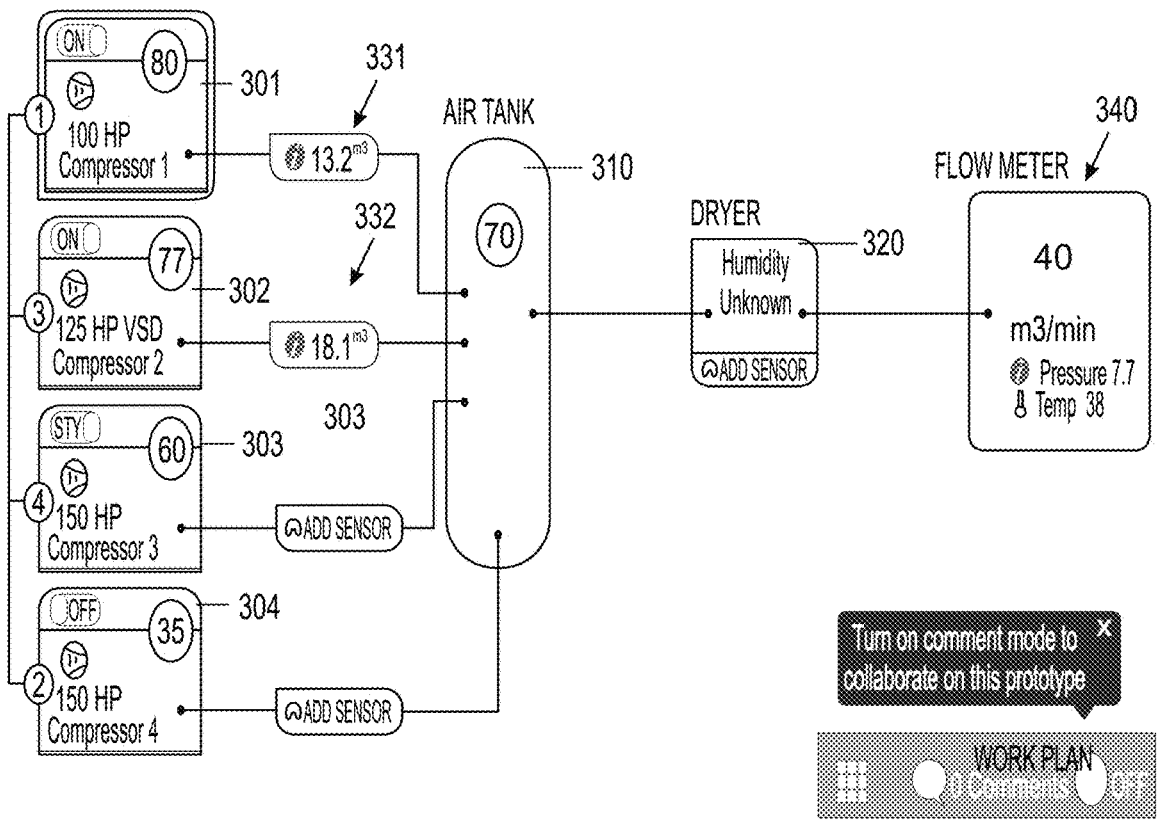
FIG. 3 is a simplified example of a schema.

Reference is now made to FIG. 3, which is a simplified example of a schema. The schema shows four air compressors 301-304 feeding into air tank 310 and then to dryer 320. Compressors 301-304 each have an internal power sensor. Volume sensors 331 and 332 measure the respective output volumes of compressors 301 and 302. Flow meter 340 measures output volume and includes two internal sensors, which measure pressure and temperature respectively. In one example, two demand output metrics are defined. The first demand output metric is the sum of the power readings of the internal power sensors of all four air compressors. The second demand output metric is the volume measured by flow meter 340. Goals and constraints may be set for some or all of the metrics measured by the sensors. The pressure at flow meter 340 is a constraint output metric. For example:
i) Goal for the first demand output metric—minimize power;
ii) Goal for the second demand output metric—maximize volume; and
iii) Constraint output metric—minimum pressure of 7.2 Bar.

Referring again to FIG. 2, in 220 communications are established with the sensors. Optionally, communications are also established with controllable peripheral machines. As discussed above, the control system must communicate with sensors and controllable peripheral machines, in order to perform continuous data collection from the sensors and to provide control signals and/or commands to the controllable peripheral machines.

Optionally, the control system tags messages to and from each physical object with a unique-id associated with the respective physical object. For direct connections, the control system pairs the source/destination of the message and with the corresponding physical device in the schema. For indirect connections routed through an external communication interface (e.g. via the SmartBox described below), the control system identifies the peripheral machine or sensor communicating via the external interface and pairs it to the corresponding physical object in the schema.

Some peripheral machines and sensors support direct communications with the control system without requiring additional hardware. Examples of direct communications include but are not limited to:
i) Push sensor data to a server over a communication network (e.g. cellular network, local network, Internet); and
ii) An application program interface (API) to a peripheral machine (such as a chiller).

If a sensor or a controllable peripheral machine does not support communications to an external system, hardware modification is required to add indirect communication capabilities where they are needed.

Optionally, the hardware modification is performed by installing a device (denoted herein a SmartBox) on the peripheral machine or sensor. It is desired that the SmartBox be as independent as possible of from malfunctions by other components. Examples of devices that may serve as a SmartBox include but are not limited to: Raspberry Pi with RS-485 ports installed, RS-232 to Cellular converter.

A SmartBox connects the physical object on which it is installed by:
i) One-way communication to the control system (e.g. for sending sensor data); or
ii) Two-way communications with the control system (e.g. for sending sensor data and inputting control commands).

Building and Training the Model

In 230, a model is trained based on the schema and training data gathered from the sensors during a training period. During the training period, the sensors send metric data to the control system. The control system uses the training data to build the model but does not change any controllable peripheral machine parameter.

As used, herein the term "training a model" means using training data gathered from the sensors to build a mathematical model, which predicts the respective values of one, or more specified metrics.

The inputs to the model are the values of the metrics measured by the sensors and provided to the control system. The model predicts energy usage by the peripheral machines, based on metric values, which are input into the model. These predictions are used to generate control settings for the controllable peripheral machines which minimize energy usage by the peripheral machine (i.e. primary goal) and supply the energy demanded by the manufacturing machines (i.e. primary constraint). Optionally, secondary goals and constraints are specified, and fulfilled if possible without violating the primary goal and constraint. (Examples of secondary goals and constraints are listed as non-leading Key Performance Indicators in the Exemplary Control System described below.)

Any type of model, which may be trained to predict specified metrics using the training data, may be used. The model is considered trained when the specified metrics are predicted with a specified degree of accuracy.

Optionally, the model is a recurrent neural network with long-short term memory (LSTM). Optionally, another type of classifier/predictor model is used.

Figure 4:
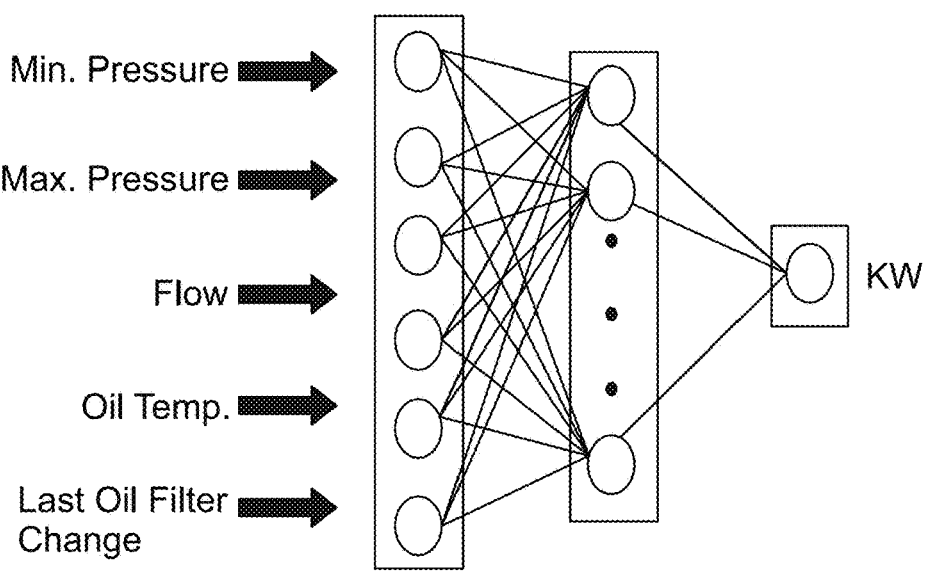
FIG. 4 illustrates and exemplary neural network model for a single metric.

An exemplary neural network model for a single metric is illustrated in FIG. 4. Five metrics are used to predict Air Compressor energy consumption. These metrics are minimum pressure, maximum pressure, flow, oil temperature and last oil filter change. Some of these metrics are measured by sensors (e.g. pressure and temperature sensors on an air compressor measure minimum pressure, maximum pressure and oil temperature, a flow sensor measures flow, etc.) and the value of one metric is calculated (e.g. last oil filter change).

Optimizing all the physical objects in the schema as a whole to create the process is very complex, because each physical object in the schema has many operational parameters, capabilities, etc. that affect the overall metrics. Optionally, in order to simplify the process, the peripheral machines are broken into object sets. A reliable model is built for each object set and then the object set's effect on the overall control system is calculated. A single overall model for the entire facility is formed by combining the models of all the object sets.

As used, herein the term "object set" means a combination of peripheral machines (and optionally other physical objects such as sensors) which together are able to produce the energy required by the manufacturing machines.

Each one of the peripheral machines must be included in a respective object set. An optimal object set would include a single peripheral machine and all sensors, which provide the metrics for the control system (such as goals, constraints, etc.).

Optionally, the model is built for non-optimal object sets denoted virtual minimal sets (VMSs), and described in more detail below.

The training data includes values of the metrics measured by the sensors at one or more sampling times. Optionally, the values are measured by the respective sensors and provided to the control system periodically during both the training and facility control periods. Further, optionally, the measurements are provided to the control system at a maximum interval of 15 seconds between measurements.

The training period ends when a certain predefined benchmark (i.e. degree of accuracy) is met. For example, the benchmark may be that the deviation between the energy efficiency predicted by system as compared to the actual value in the last 24 hours is no more than +/−5%.

Optionally, training data is gathered for at least a specified minimal learning duration. Optionally, the minimum learning duration is one week. Optionally, the learning duration is between one to four weeks.

For a given timeframe, training data is gathered from the sensors, and optionally the average/minimum/maximum values of each measured metric are determined. This information is fed into the model, along with the measured energy output as the training continues.

Shortening the duration of the timeframe may be required in the following cases:
i) A status parameter value has changed during a timeframe. For example, if in the last 10 seconds of a timeframe a peripheral machine was off, then the timeframe is split into two shorter timeframes: 20 seconds when the peripheral machine was on, and 10 seconds when it was off Failing to shorten the time frame may result in an inaccurate model.

Optionally, the sampling interval is around 30 seconds, or, alternately, two times more than the minimum measurement interval.

Optionally, some metrics are used to train the model as a group. For example:
i) Changes in a demand output metric and in all sensors monitoring the same metric type. For example, if a demand output metric is maximizing volume measured by a volume sensor at the end of a pipeline, then all other sensors measuring a volume metric will be related to the demand output metric.
ii) Changes in a constraint output metric and in all sensors monitoring the same metric type. For example, if the constraint output metric is a minimum water temperature of 32 degrees measured by a temperature sensor at the end of a pipeline, then all other temperature sensors will be related to the constraint output metric.
iii) Changes in a status metric and their effect on other types of metrics. For example, the effect may be that when Chiller B has an On/Off status of On it consumes 60 KWh, but when its On/Off Status is Off it consumes 0.3 KWh iv) Disturbances between the same type of metric that are measured at different places along the schema. For example, the disturbance may be that when the average volume (m3/h) in a certain pipe is below 10 m3/h, then the pressure reading in sensor A is X and the pressure reading in sensor B (which is located after sensor A) is X minus 0.4 Bar, but when the average Volume (m3/h) in certain pipe is above 10 m3/h, then the pressure reading in sensor A is X and the pressure reading in Sensor B is X minus 0.8 Bar.

Initializing the Model

Optimally, the control system has up to date values for all metrics in the object set. However, for a newly installed control system in a factory all possible values are not yet available. Furthermore, even an established control system may never have data for all possible values. For example, if an object set has a chiller that works between 20 to 40 degrees Celsius, the control system will not have measured values of the constraint and demand output metrics for the case where the chiller is set to 50 degrees Celsius.

Optionally, the manufacturer specifications for the peripheral machines and other physical objects are used as the initial basis for the model. Typically, manufacturer specifications include the maximal/minimal values for one or more operating parameters of the machine (for example for air compressors, a maximum output of 1,340 CFM at 107 PSI drawing 57 KW/h). The specification usually includes the output in various load scenarios (for example, in 75%, 50% of maximum power).

It is noted that while the manufacturer specification may be accurate for new peripheral machines, this may not be true for older peripheral machines (particularly those that were maintained poorly or operated not in accordance with the manufacturer specifications). However, these inaccuracies are overcome during the training period when actual measured data is used to train the model.

Virtual Minimal Sets

In an exemplary embodiment, the object sets, which are modeled, are virtual minimal sets (VMSs).

A valid VMS meets the following criteria:
i) Includes at least one peripheral machine;
ii) Includes all demand output metrics are measured in the object set;
iii) All of the constraint metrics that are measured in the object set (if any);
iv) No valid subset exists under this object set (i.e., this is the smallest possible object set that may be generated for one or more of the peripheral machines in the object set);
v) The most advanced physical object in the order of energy flow must have all the previous connected physical objects along the energy flow included in object set. For example, if an object set contains a volume sensor that is fed by five air compressors, then all five air compressors must be included in object set.
iv) A physical object may appear in only one VMS.

A model built for a VMS should be able to predict:
i) The minimum/maximum value for every metric that the VMS may generate. For example, if one of the demand metrics is cooling tons, what are the minimum/maximum cooling tons that the four chillers in the VMS may generate.
ii) Given certain values of parameters of controllable peripheral machines, what is the value for every constraint output and demand metric that the VMS may generate. For example, if two of the chillers in the VMS are turned off, how many cooling tons may the VMS generate.

Controlling the Peripheral Machines

Referring again to FIG. 2, after the model is trained, in 240 the control system uses the trained model to control some or all of the controllable peripheral machines in the facility. Further data is gathered from the sensors while the manufacturing facility is operating. The newly collected data is input into the trained model and future values of some or all of the metrics are predicted. Based on these predictions, the control system decides what control settings should be used for the controllable peripheral machines (and optionally other physical objects) in order to ensure that the specified goals (e.g., values of demand output metrics) are met without violating any specified constraints (e.g. values of constraint output metric).

An exemplary embodiment of controlling the peripheral units using the trained model is described in detail in the Control System Run section below and illustrated in FIGS. 5-9.

Optionally, the control system is run periodically (e.g. every five minutes). The time period may be selected according to the nature of the manufacturing facility. In factories with relatively quick variations in parameters and machine response times, the control system may be run more often than in factories with slow variations and response times.

Optionally, the control system is also run when an external system calls for an immediate run of the control system. For example, an external system may call for a control system run if it identifies that a constraint output has not been met, if it identifies a malfunction in one of the operating peripheral machines or for any other reason that requires an immediate activation of the control system.

Optionally, the minimum duration between control system runs is two minutes.

Figure 5:
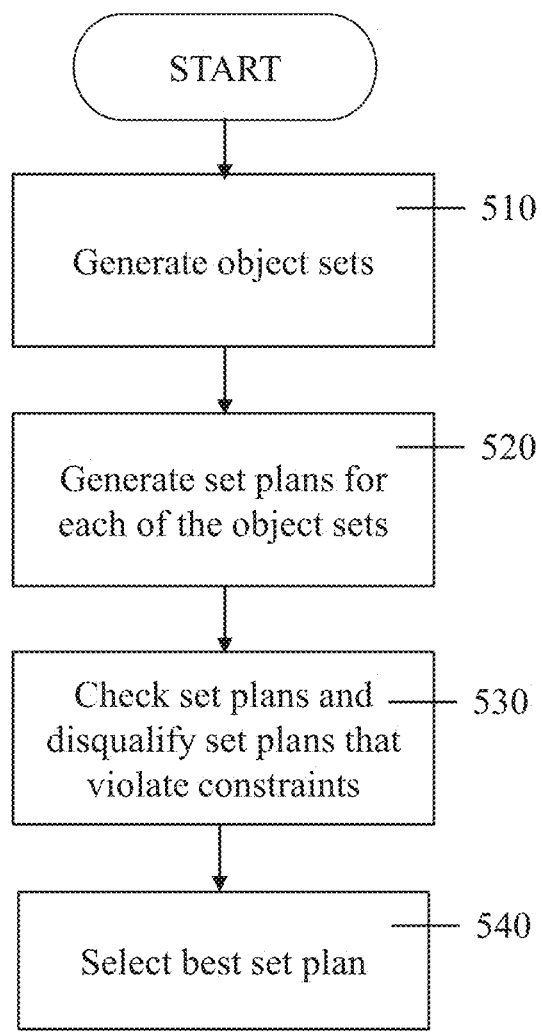
FIG. 5 is a simplified flowchart of a method for selecting control settings for controllable peripheral machines, in accordance with an exemplary embodiment of the invention.

Reference is now made to FIG. 5, which is a simplified flowchart of a method for selecting control settings for controllable peripheral machines, in accordance with an exemplary embodiment of the invention.

In 510, object sets are generated of all possible combinations of peripheral machine, where a combination is considered valid if no constraints are violated when the peripheral machines in the object set operate at maximum energy capacity (100% of the measured or predicted capacity). In other words, a combination of peripheral machines that is capable of supplying all the required energy to the manufacturing machines without violating any constraints. One object set may be a subset of another object set (for example peripheral machines A and B also appear in object set A, B and C). An exemplary embodiment of generating object sets is presented in FIG. 7.

As used, herein the term "capacity" means a volume metric of the energy that a peripheral machine can generate. For example, an electric generator's maximum capacity may be 500 kW/h, and air compressor's capacity may be 10 CFM/h and a chiller capacity may be 30 cooling tons/h.

In 520, set plans are generated for each of the sets. A set plan is an object set along with specific control setting(s) for each controllable physical object in the object set. All possible combinations for a given object set are generated, where each combination has different values for controllable peripheral machine parameters. Thus, an object set may have multiple set plans. An exemplary embodiment of generating set plans is presented in FIG. 8.

In 530, the set plans are checked to ensure that they do not violate any constraint. Set plans that violate the constraints are disqualified. An exemplary embodiment of checking set plans is presented in FIG. 9.

In 540, all set plans that were not disqualified are compared to the primary goal, and optionally secondary goals, and the best set plan is selected. The best set plan minimizes energy usage by the peripheral units and meets the primary constraint of providing the energy demanded by the manufacturing machines, and, optionally, as many secondary goals and/or constraints as possible.

Optionally, if there are no qualified set plans, which fulfill all of the goals and do not violate any constraints, the goals and/or constraints are modified in order to ensure that there is at least one qualified set plan. For example, if no sets plans supply all the required energy even when the peripheral machines operate at maximum capacity, then the set plan with the highest energy supply capacity is selected.

Optionally, the best set plan is compared to the set plan currently in use. If it is better than the current set plan, confirmation that the newly-identified best set plan should be used is requested (in semi-automatic mode) or the best set plan automatically replaces the current set plan (in fully-automatic mode).

Figure 6:
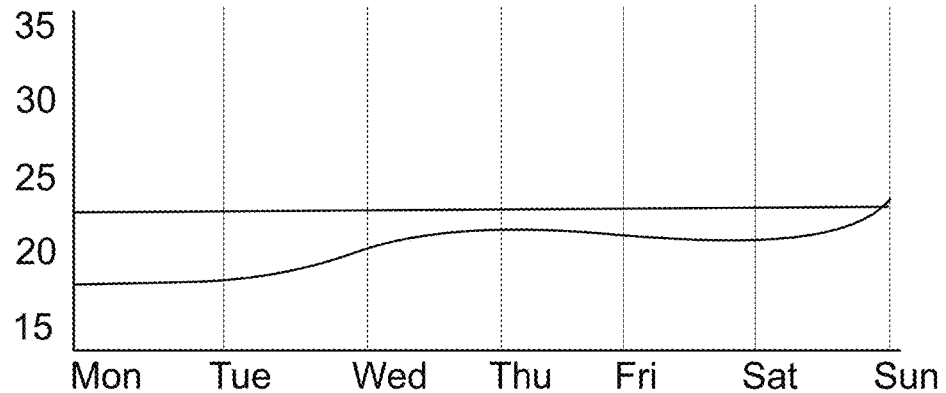
FIG. 6 illustrates an exemplary semi-automatic mode message that suggests replacing the current set plan with another one.

FIG. 6 illustrates an exemplary semi-automatic mode message that suggests replacing the current set plan with another one. The message includes the predicted improvement in performance (e.g. 372 KW/Hr) and financial savings.

Figure 7:
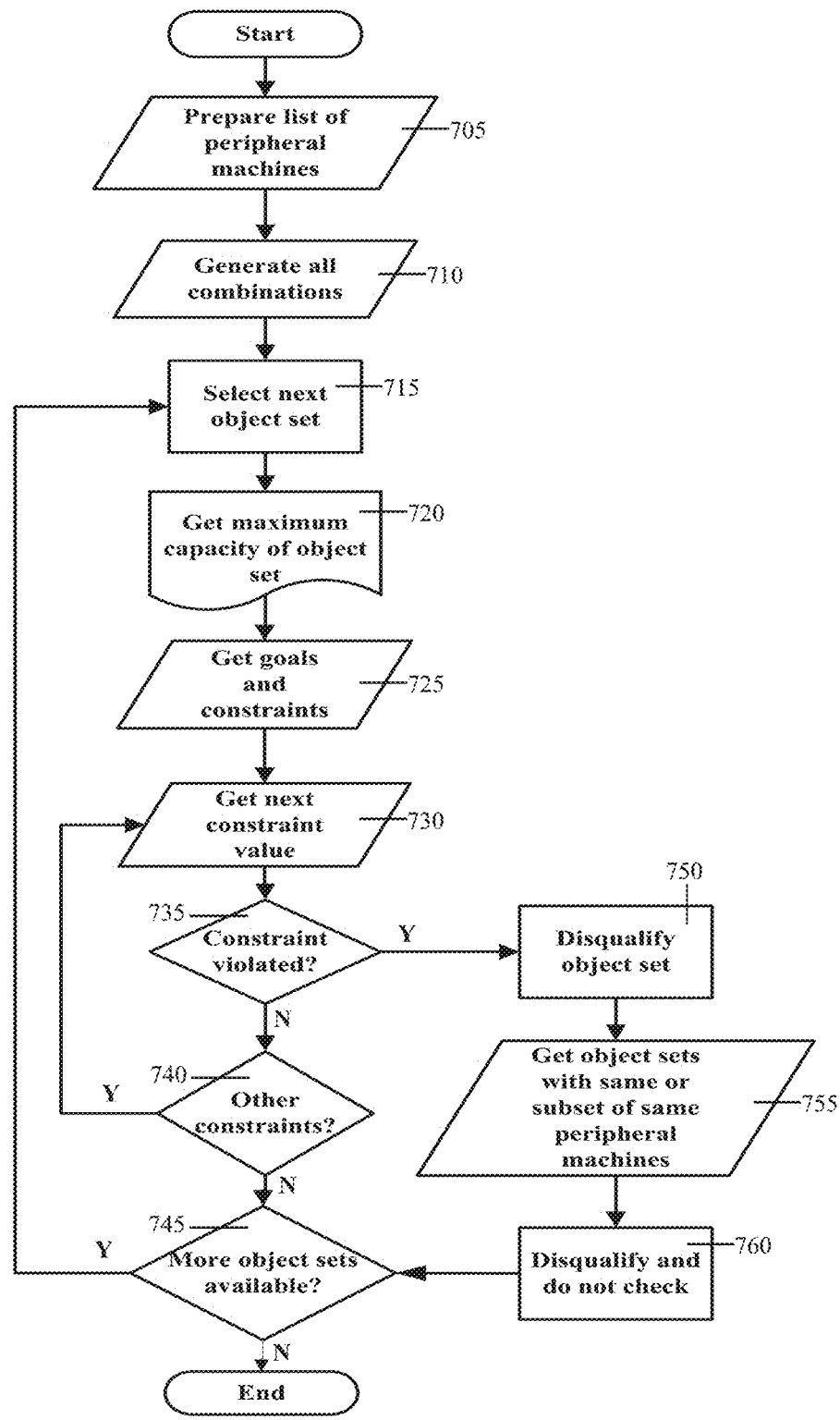
FIG. 7 is a simplified flowchart of a method for generating object sets, according to an exemplary embodiment of the invention.

Reference is now made to FIG. 7, which is a simplified flowchart of a method for generating object sets, according to an exemplary embodiment of the invention.

In 705, a list of all the peripheral machines is prepared. Optionally, this list is retrieved from the schema or obtained by analyzing the schema. Alternately or additionally, portions of the list are provided by an external source.

In 710, all possible combinations of the peripheral machines (and optionally other physical objects involved in the energy supply process) are generated. Each combination is an object set. The object sets are ordered by descending capacity. If more than one combination has the same capacity, they are ordered by a descending number of peripheral machines.

In 715-760, the object sets are analyzed and combinations, which violate their respective constraints, are discarded. It is noted that different combinations may have different constraints, depending on the peripheral machines included in the object set.

In 715, an object set is selected. In 720, the maximum capacity (estimated or measured) of the selected object, set is obtained. In 725, relevant goals and/or constraints for the selected object set are obtained. In 730-740, the constraints are checked in turn to determine if any are violated. If, in 735, a constraint is found to be violated, in 750-760 the selected object set and all object sets with the same combination or a subset of the peripheral machines in the selected object set are disqualified and not checked further. If none of the constraints are violated, the object set is retained and the same process is repeated for all remaining sets.

Figure 8:
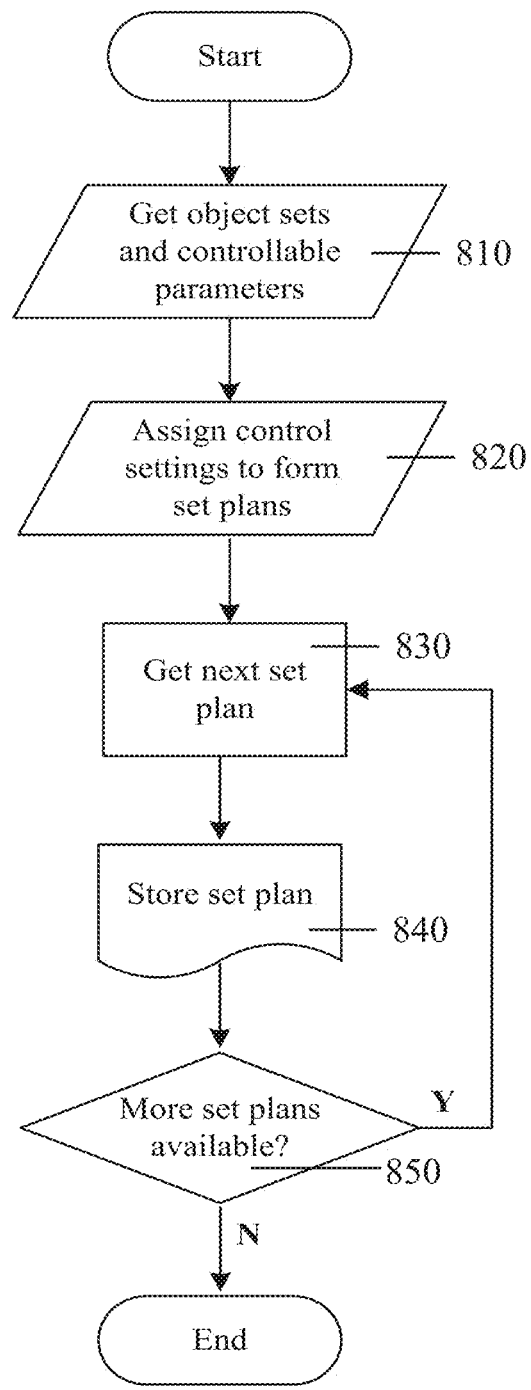
FIG. 8 is a simplified flowchart of a method for generating set plans, according to an exemplary embodiment of the invention.

Reference is now made to FIG. 8, which is a simplified flowchart of a method for generating set plans, according to an exemplary embodiment of the invention. In 810 and 820, controllable parameters (and their possible values) are obtained for all controllable peripheral machines in an object set, and attached to the object set to form a set plan. In 830-850 all the set plans are stored.

Figure 9:
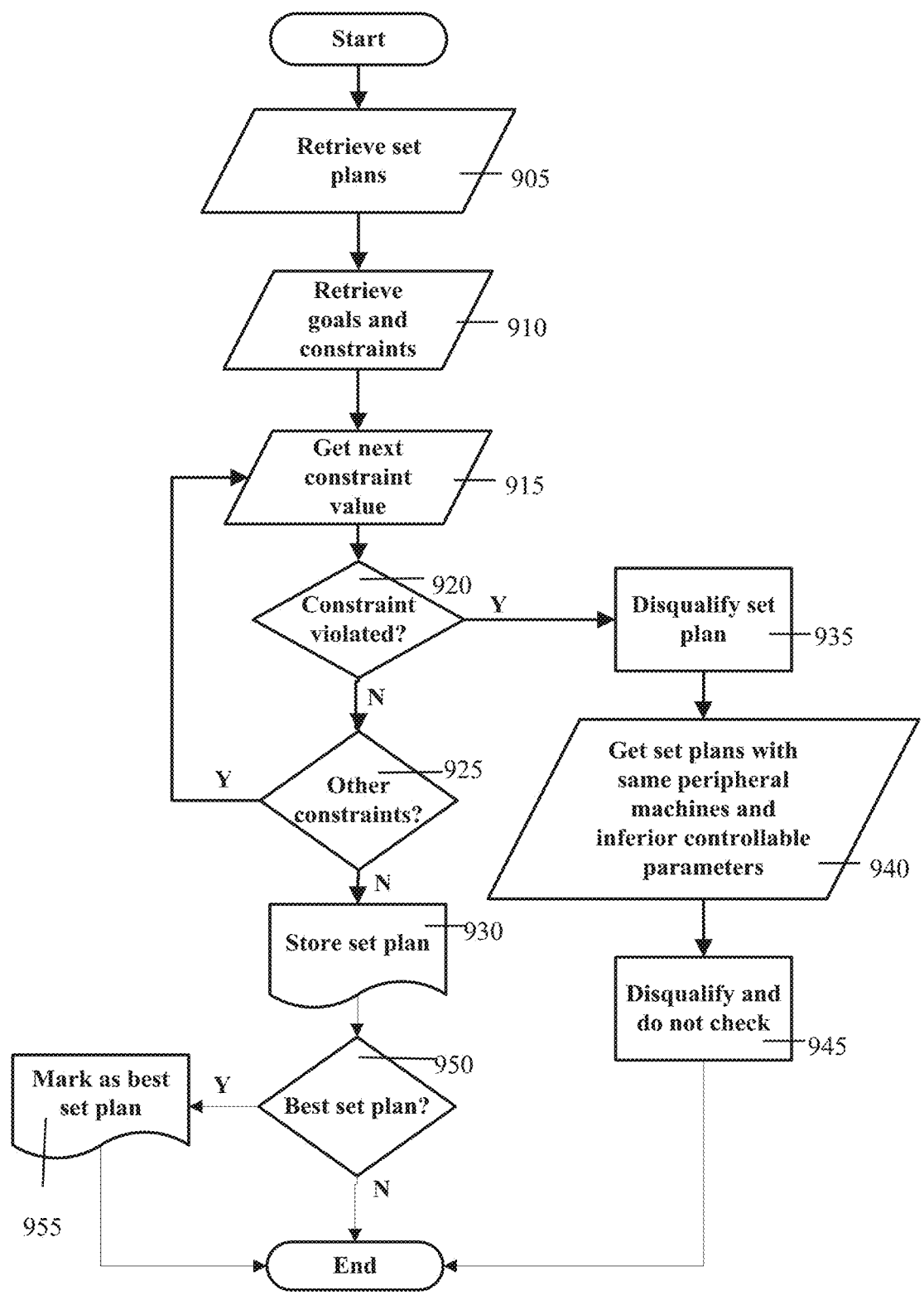
FIG. 9 is a simplified flowchart of a method for checking set plans, according to an exemplary embodiment of the invention.

Reference is now made to FIG. 9, which is a simplified flowchart of a method for checking set plans, according to an exemplary embodiment of the invention.

In 905 set plans are retrieved. In 910, goals and constraints for the control system are retrieved. In 915-925, all constraints are checked. If no constraints are violated, the set plan is considered qualified and stored. If a constraint is violated, in 935 the set plan is disqualified.

In 940-945, all set plans with the same peripheral machines but inferior controllable parameters are disqualified and not checked. For example, consider the case where set plan A and set plan B share the same peripheral machines. Set plan A uses machine 1 at 80% max capacity and set plan B uses machine 2 at 60% max capacity. Set plan A was tested against the constraints, was found to be violating them and was disqualified. Since set plan B's maximum capacity is lower than the maximum capacity of set plan A, set plan B is disqualified automatically.

After all set plans have been checked, in 950-955 the best qualified is detected and marked.

In some embodiments of the invention, the control system includes sensors, a network interface and a processor. The sensors monitor metrics of respective peripheral units. As discussed above, the metrics are indicative of energy transfer from the peripheral machines to the manufacturing machines. The network interface supports communication between the control system and the sensors, and optionally also with controllable peripheral machines.

Optionally, some or all of these communications are routed through one or more Smartboxes, as described above.

The processor performs the analysis and calculation necessary to minimize the energy consumption of the peripheral machines. These operations include:

Mapping supply relations between the peripheral units and the manufacturing units into a schema, according to any embodiment described herein;

Establishing communication with the sensors via the network interface, according to any embodiment described herein;

Training the model based on the schema and training data gathered by communication with the sensors during a training period, according to any embodiment described herein; and Controlling the peripheral units based on the trained model and further data obtained from the sensors, according to any embodiment described herein.

Optionally, the processor builds the model by:

Dividing the peripheral units into object sets;

Generating a respective model for each of the object sets; and

Combining the respective models for the objects sets into a single model, which includes all of the peripheral units.

Optionally, the model is a recurrent neural network with long-short term memory.

Optionally, the control system performs control system runs. Each of the runs includes:

Generating all valid combinations of peripheral units. A valid combination is a set of peripheral units capable of supplying the total energy demanded by the manufacturing units while meeting specified constraints on metric values;

Generating all possible set plans for each of the combinations. Each of the set plans specifies different control settings for control parameters of the controllable peripheral units which are present in the combination;

Identifying all set plans which meet the specified constraints;

Selecting a set plan minimizing the energy usage by the peripheral units from the identified set plans; and Setting the controllable peripheral units to the control settings given by the best set plan.

Optionally, the peripheral units include at least one of: an air compressor, a chiller, a vacuum pump, a filter, a dryer and a heater.

Exemplary Control System

In an exemplary embodiment, the control system includes two main interconnected units, a monitoring unit and a proactive engine unit. Both units communicate with other physical objects to control the peripheral machine control settings in order to maximize energy efficiency.

The monitoring unit measures metrics of the peripheral machines (e.g. air compressors, chillers, water pump, vacuum pump etc.) through sensors. Examples of sensors that may be used include: temperature sensor, current sensor, voltage sensor, flow sensor and others. The monitoring unit includes at least one smart device (e.g. the Smartbox described above) which connects it to the sensors and to controllable peripheral machines The monitoring unit operates to understand the efficiency of the peripheral machines, how much energy they produce, how much energy reaches the production line and how much energy is consumed by the peripheral machines.

As used, herein the term "production line" means the demand side manufacturing machines, which demand energy from the peripheral machines.

The proactive engine unit performs operation optimization (and optionally predictive maintenance) of the peripheral machines. The proactive engine connects to the peripheral machine (e.g., air compressors, chillers, pumps, heating, ventilation, and air conditioning equipment, etc.) to perform precise monitoring of the peripheral machines as well as to obtain full control over the peripheral machine settings. The proactive engine also connects to the general systems of the manufacturing facility, including but not limited to: Human-Machine Interface (HMI), SCADA and manufacturing execution systems (MES). The connection to general system (s) enables the proactive engine unit to learn, in real-time and/or ahead of time, what the energy production needs are (in order to supply enough energy to the demand side equipment). The proactive engine receives all the available data and information relevant to the situation of the peripheral machines, and optionally other machines in the facility, and actively triggers actions to save energy and optimize efficiency.

As used herein the term "production needs" means the amount of energy demanded by the manufacturing machines. In this example, the production needs are the primary constraint, which must be met by the control system.

The proactive engine contains two main components, a plan processor and a modeler. The plan processor accumulates all the data (e.g. data from the sensors) and uses models to generate a valid operation plan. The operation plan corresponds substantially to the set plan described above, and contains respective control settings for a combination of peripheral machines (i.e. object set).

Types of models include but are not limited to: rule-based, thermo-dynamic and artificial intelligence (AI). The modeler contains the different models, and uses sensor data from the plan processor to generate a relevant outcome (i.e. prediction) for each step in the plan processor. The monitoring unit, plan processor and the modeler together control and operate the physical devices (e.g. peripheral machines, sensors and other equipment), enabling a full optimization of energy transfer between peripheral machines and the production line while maximizing efficiency and utilization.

An exemplary embodiment of a plan processor is described below and illustrated in FIG. 11.

In an embodiment of the invention, the monitoring unit uses the smart devices to measure through external sensors all the required input for the system to calculating the efficiency of the machines, to optimize the operation plan of the machines and to predict the maintenance of demand-side equipment. Types of data measured by the external sensors include but are not limited to:
a) Energy consumption of all peripheral machines of the same type (e.g. all air compressors);
b) Energy consumption of a subset of the peripheral machines of the same type (e.g. one air compressor);
c) Energy consumption of each monitored peripheral machine;
d) Total energy output of all peripheral machines of the same type (for example: total compressed air volume per hour, total cooling in an hour, etc.);
e) Total energy output of a subset of the peripheral machines of the same type;
f) Energy output of each individual monitored machine;
g) Monitored machines workload, hours, and various operational and maintenance data;
h) C/A=Overall entire Peripheral/sub-Peripheral efficiency; and
i) $B_i/D_i$=Monitored machine efficiency (Output/Energy that was used to generated this output).

Figure 10:
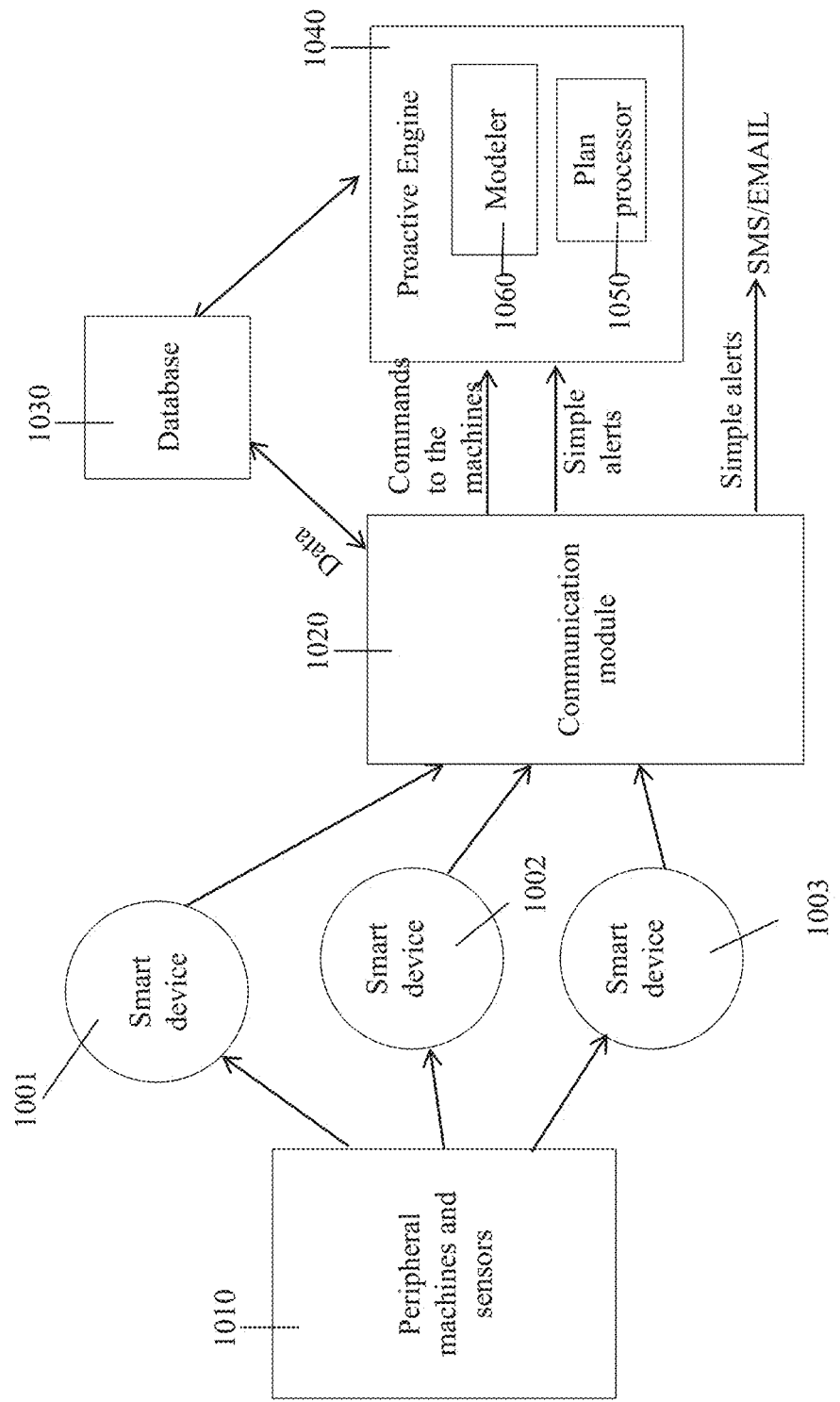
FIG. 10, which is a simplified block diagram of a control system controlling peripheral machines, according to an exemplary embodiment of the invention.

Reference is now made to FIG. 10, which is a simplified block diagram of a control system controlling peripheral machines, according to an exemplary embodiment of the invention.

Proactive engine 1040 is a cloud-based module, which analyzes the data collected from the sensors, and optionally displays it to the user. Based on the analysis, proactive engine 1040 selects control settings for peripheral machines 1010, and sends commands with peripheral machine control settings to communication module 1020. Communication module 1020 forwards the commands to smart devices 1001-1003, which adjust the peripheral machine control settings in accordance with the commands. Optionally, proactive engine 1040 also provides recommendations, insights and proactive actions to improve efficiency based on the analysis. Optionally, communication module 1020 also send alerts and other information by SMS and/or email. Optionally, communication module 1020 and proactive engine 1040 have access to database 1030 for any necessary storage and retrieval of information.

Smart devices 1001-1003 are connected to peripheral machines and sensors 1010 on the power supply line (i.e. supply side physical objects). Smart devices 1001-1003 communicate with communication module 1020.

Communication module 1020 is an Internet of things (IoT) based module which receives and transmits information to smart devices 1001-1003. Optionally communication module includes analysis capabilities and performs some analysis functions, such as storing information in database 1030, recognizing abnormal data, and triggering alerts and/or proactive measures if necessary. Alternately, communication module 1020 operates solely as a communication interface.

In an embodiment of the present invention, smart devices are attached to respective peripheral machines as an add-on. The smart device is capable of obtaining data from other devices such as sensors and PLCs (if present) and/or includes a sensor, which performs the measurements. The smart device communicates may communicated over a wired and/or wireless network, and executes the commands issued by proactive engine 1040 directly and/or based on rules.

The smart devices act as a gateway between the connected peripheral machines and sensors and cloud-based proactive engine 1040 when the Internet is available. When the Internet is unavailable (e.g. due to a malfunction or by design), the smart devices rely on a light proactive engine module and smart device to smart device communications.

The smart devices store and request information from other smart devices in the network, based on rules. Every smart device is connected to other smart devices in the facility through a network. Optionally, the network is connected to a cloud service. One of the smart devices in the network is selected to be the Central Smart device (CSD) and to manage the entire operation of smart devices. The CSD distributes the execution of the necessary calculations and other tasks between the different smart devices. The CSD also sends the specific commands to the different smart devices. If the CSD is not working or not transmitting, then another smart device is selected as CSD automatically.

Alternately or additionally, communication module 1020 communicates with peripheral machines, which are not connected to a smart device directly, and/or via a different type of controller (i.e. a mini-PC).

In an exemplary embodiment, a smart device (for example the SmartBox described above) includes the following three components:

1) Sampling/Interface module—enables two-way communications between the smart device and the peripheral machines, PLC, sensor(s) etc. The Sampling/Interface module is also responsible for the sampling of the data. The sampled data is sent to the Cloud. When there is an incoming command from the control system, the Sampling/Interface module communicates with the connected device (i.e. the peripheral machine or other physical object) and inserts the command.

2) Device to Device communications module—securely connects to other smart devices to allow "offline mode" (no Internet) communications and operation between peripheral machines on a local network. The Device to Device module works by identifying all the valid smart devices on the local network and opening a two-way communications channel with them. In this way, one smart device may communicate with each other, to request information from another smart device information regarding a peripheral machine, sensor or other device to which it is not directly connected and/or to send a command to a peripheral machine, sensor or other device to which it is not directly connected.

3) Light Proactive engine—is a light version of the Cloud based proactive engine 1040 that enables offline operation of devices. The Light Proactive engine is primarily focused on meeting production line demand while proactive engine 1040 in not available (e.g. supplying enough compressed air, cool water, vacuum power, etc. so that the production line keeps going). The light proactive engine is shared across the different smart devices that communicate with each other. The Light Proactive engine is optionally based on a greedy algorithm for making the locally optimal choice at each stage of the problem in order to find the optimum using IF/else algorithm. The goal of the algorithm is to find the shortest way of working, regardless of data and other requirements. The light proactive engine also handles alerts, that identify when to restart proactive engine 1040 on the basis of dynamic alerts and to examine changes that may affect energy consumption and give the most appropriate and effective solutions.

Proactive engine 1040 is cloud based, and contains plan processor 1050 and modeler 1060, which together control and operates the actual physical devices with the smart devices.

Plan processor 1050 is in charge of getting the relevant data, activating modeler 1060 and generating a plan to be delivered and executed by the smart devices.

Modeler 1060 is based on three technological layers, where each level enriches the level below and provides better accuracy and optimization. However, each additional level requires more data. Plan processor 1050 decides which modeler layer(s) may be used. This is because not all modeler layers may be used for all tasks of the plan processor.

Modeler 1060 includes three sub-systems in order: the first is the rule-based system, the second is the thermodynamic system and the third is the Artificial Intelligence (AI) system.

1) The rule-based system needs a minimal amount of data, and provides basic, expert-based rules that enable sufficient operation of the peripheral machine. The rule-based system turns on/off peripheral machines (e.g. air compressors) according to production demand and may not predict machine efficiency with changes in production by the demand side. The rule based sub-system is based on a greedy algorithm for making the locally optimal choice at each stage of the problem in order to find the optimum. In this case, the goal of the algorithm is to find the shortest way of working, regardless of data and other requirements. The rule based sub-system receives the needed data and outputs the required commands.

2) The thermodynamic system may start working after a minimum time period after control system installation (optionally between two to four weeks). The thermodynamic system runs on physical formulas that constitute the technological basis of the algorithm and require a process of continuous learning. At first a general formula, which is adapted to a general type of machine, is used. After a continuous learning of the unique parameters and characteristics of each specific machine the thermodynamic system automatically updates the formula coefficients. The thermodynamic system provides an accurate multivariate function that given a theoretical state (e.g., increase of 10% in production demand), may estimate which equipment should be turned on/off or change parameters in order to maximize efficiency. The thermodynamic system updates the function coefficient as it studies the machines and may help facilities with similar types of peripheral machines to have a shorter optimization and learning time (i.e. a shorter learning curve).

3) The AI system provides learning and optimization of peripheral machines controls based on AI learning on vast amount data regarding machines and facilities. The AI system runs a batch-based learning on a daily or weekly cycle to update the model, and this model is used by all facilities that have enough data to run this AI system. The AI system is expected to provide the better optimization of energy, maintenance and other Key Performance Indicators (KPIs) compared to the other sub-systems (rule-based and thermodynamic). The AI system is based on neural network algorithms in order to predict malfunctions, predict efficiency in every operation mode, etc. Plan processor 1050 includes a description of algorithms used in the AI system, since different plan processor tasks may require different AI models.

Plan processor 1050 takes the data collected from the various machines/sensors in a facility, runs models on how to operate the peripheral machines effectively, with better maintenance and other KPIs, and produces a set of commands (carrying control settings) that are sent to the smart devices, which in turn provide the commands to respective peripheral machines.

Optionally, plan processor 1050 runs periodically (e.g. every one hour) and/or when communication module 1020 identifies a problem that might require a change to the operation plan.

Figure 11:
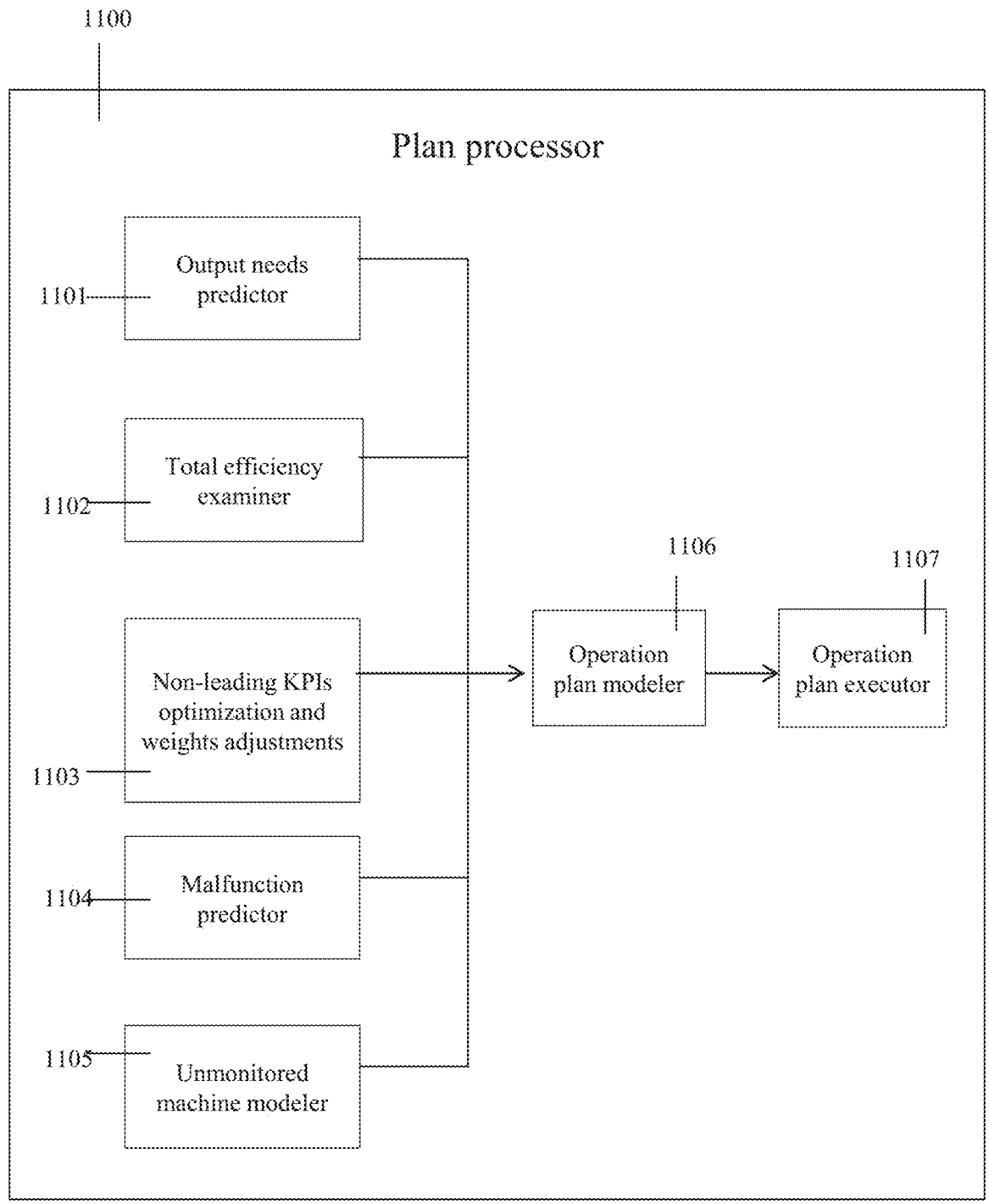
FIG. 11 is a simplified block diagram of a plan processor, according to an exemplary embodiment of the invention.

Reference is now made to FIG. 11, which is a simplified block diagram of a plan processor, according to an exemplary embodiment of the invention. Plan processor 1100 includes seven main components.

1) Output needs predictor 1101—determines in real-time or every time interval (e.g. a specified number of hours) what is the projected needed output to supply to the production line (i.e. demand side), where the projected needed output means the predicted output (function of t—time) for the next predetermined time interval (i.e., y minutes). Output needs predictor 1101 may also be activated in cases where there is a drastic change in production needs (real-time prediction) or it may be activated as a scheduled run, determined by the confidence of previous prediction as a function of t (e.g. when enough time has passed from the last prediction, the predicted output (t) is less confident than needed or substantially worse from what may be achieved from a new prediction). Output needs predictor 1101 is also activated at the end of the last predictor prediction function. Output needs predictor 1101 uses the recurrent neural network with LSTM deep learning algorithm.

2) Total efficiency examiner 1102—calculates in real-time the efficiency of each monitored machine and the overall system efficiency. Besides the direct parameters that affect output of machines (like working pressure), efficiency examiner 1102 also looks at operation parameters such as oil pressure, motor current and motor rpm. Efficiency examiner 1102 evaluates the contribution of each parameter to the overall energy consumption by the peripheral machines. This evaluation helps to understand the correlation of each parameter as a function of energy consumption. For example, consider the case in total efficiency examiner 1102 finds that when oil temperature is at 60 degrees the energy consumption is average but when oil temperature is at 40 degrees, the energy consumption goes up by 20%. From this case, it may be derived that for each increase of 10 degrees in oil temp, the energy consumption goes up by 10%. The more samples are taken, the more advanced models may be generated to calculate the efficiency. In case of big changes in efficiency (e.g. as compared to a pre-defined level), total efficiency examiner 1102 triggers operation plan modeler 1106 to re-evaluate the operation plan (e.g. turn off a machine that has low efficiency and activate a machine with higher efficiency instead).

Figure 12:
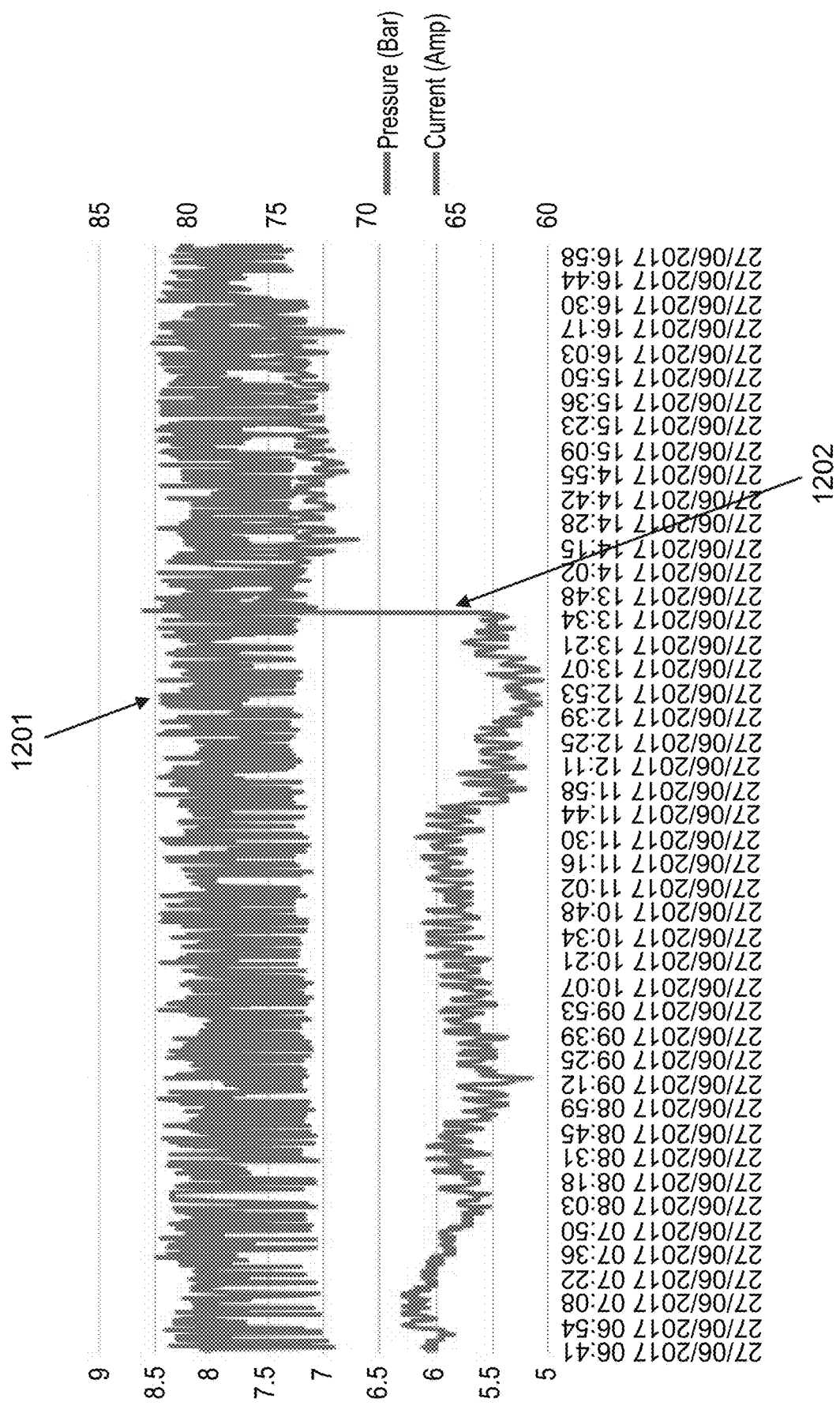
FIG. 12 illustrates an exemplary a situation in which total efficiency examiner triggers operation plan modeler to re-evaluate the operation plan.

FIG. 12 illustrates an exemplary a situation in which total efficiency examiner 1102 may trigger operation plan modeler 1106 to re-evaluate the operation plan. FIG. 12 shows the generated pressure 1201 (Bar) and motor current 1202 (Amp) of an air compressor. The graph shows that at some time the motor current 1202 increases from about 65 amps to 75 amps, while the generated pressure 1201 stays at the same level. In this case, efficiency examiner 1102 triggers operation plan modeler 1106 to re-evaluate the operation plan, since the machine efficiency has changed dramatically or there was a sudden unanticipated change in production needs.

3) Non-leading Key Performance Indicator (KPI) optimization and weights adjustments module 1103—Non-leading KPIs are secondary goals of the control system and typically do not have a short-term effect on operation/efficiency, but may affect them on the long-term and/or money-wise objectives such as maintenance costs. The control system optimizes these parameters as long as the leading KPIs (e.g.

maximizing efficiency and meeting production needs) are not hurt. The outputs of optimization module 1103 are suggestions to operation plan modeler 1106 for parameter changes (like pressure, machine on/off, etc.) of peripheral machines based on priority. The optimization and weights adjustments module 1103 uses a neural network model with predefined values for weights to generate suitable suggestions.

4) Malfunction predictor 1104—determines in real-time if one of the monitored machines is about to malfunction and disrupt the operation plan and/or does not meet the energy production needs. In a first example: if oil temperature increases to 15 degrees higher than the optimal temperature, it is known from previous experience that oil replacement may be needed and/or that worn-down parts may malfunction soon and/or very high ambient temperature. (These possibilities may be validated with other equipment or external data sources.) In these cases, malfunction predictor 1104 estimates that a malfunction is near and based on past experience, predicts that the machine will break down a few days after the beginning of the phenomenon. A second example is when a routine treatment, which should be done every 4000 work hours, was not done on time and the machine is closer to 6000 work hours from previous treatment. In this case, a 5% decrease is expected in efficiency with every additional 500 work hours without treatment and an increased probability of malfunction of 10% in the next week. Malfunction predictor 1104 triggers (with a measure of certainty and occurrence in time) the operation plan modeler 1106 to re-evaluate the plan based on the upcoming machine malfunction. Malfunction predictor component 1104 uses a mass training data model (which may be taken from other facilities/sites) on similar/identical machines parameters that might cause malfunction using recurrent neural networks with LSTM.

5) Unmonitored machines modeler 1105—An unmonitored machine is a machine that is either not connected to a smart device or for some reason the machine/smart device is not working or transmitting to the smart device network. Unmonitored machines modeler 1105 studies the unmonitored machines (if any) over time by monitoring changes in energy consumption and generated output compared to monitored machines. The energy consumption of the unmonitored machines is calculated by subtracting the energy consumption of the monitored machines from the total energy consumption. The generated output of the unmonitored machines is calculated in a similar manner, by reducing the output of the monitored machines from the total output. The unmonitored machines modeler component 1105 also studies if there are cases where the unmonitored machines operation changes, for example how does the unmonitored machine respond to changes in production needs, does it generate different output as a function of hour in a day, etc. Unmonitored machine modeler 1105 uses a K-means clustering model to identify the number and/or types of the unmonitored machines along with recurrent neural networks with LSTM to study historical behavior of the unmonitored machines. The output of unmonitored machines modeler 1105 is a prediction of the unmonitored machines behavior (e.g. for the next specified number minutes as a function of time and needed output level). This output is sent to operation plan modeler component 1106.

6) Operation plan modeler 1106—inputs the outputs of the above mentioned components 1101-1105, and derives the best operation plan (denoted the execution plan, and which corresponds substantially with the above described best set plan) in order to maximize efficiency and meet production needs, optionally while also taking into account the non-leading KPIs and the predicted upcoming malfunctions.

7) Operation plan executor 1107—executes the execution plan. The execution plan is generated in the central smart device (i.e. the smart device selected to be the CSD) and passed as a set of commands and rules to other smart devices in network. The execution plan contains one or more of: immediate commands to execute, rule/input base commands to execute, trigger values for when to alert of some deviation in the operation plan and information required by the CSD (e.g. to run other components).

Figure 13:
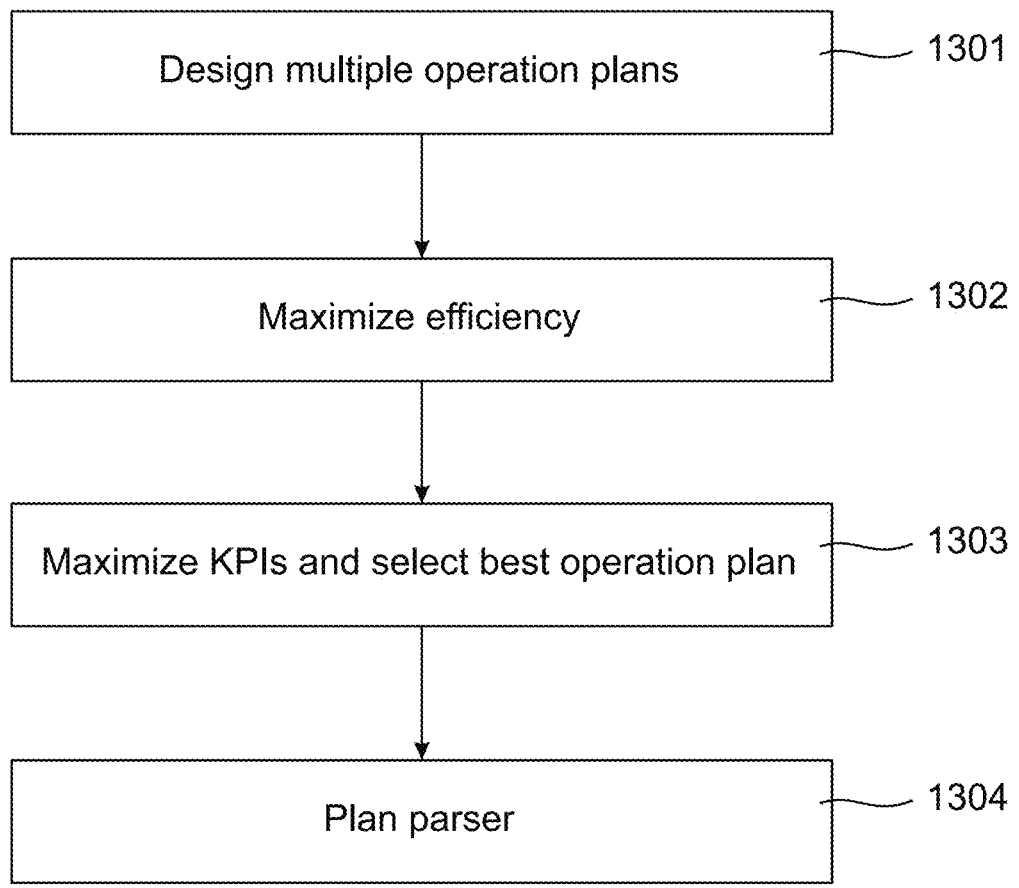
FIG. 13 is a simplified flowchart showing the operation of an operation plan modeler, according to an exemplary embodiment of the present invention.

Reference is now made to FIG. 13, which is a simplified flowchart showing the operation of an operation plan modeler, according to an exemplary embodiment of the present invention. In essence, FIG. 13 illustrates an exemplary embodiment of the method of FIG. 5.

In 1301, multiple operation plans are designed by a plans designer. The plans designer works iteratively to find the best operation plan by checking all possible valid combinations of peripheral machines (i.e. object sets) which supply the energy in order to meet production needs. The plan designer generates all possible operation plans.

The plans designer has a single objective, which is to generate an operation plan that is capable of meeting production needs in terms of output. The inputs to the plans designer are each machine in a station and its respective output. A station is a group of machines producing the same product (e.g., compressed air, cold water). For example, if there are three machines in the station, and machine A produces 2000 L/h, machine B produces 3000 L/h and machine C produces 5000 L/h and the production needs are 6000 L/h in the next hour, then the plan designer finds (through exploring each possibility) which combinations of machines are capable of meeting production demand. In this example, it is machines C+A, C+B and C+B+A (since there might be cases in the next model that it may be better to run three machines rather than two).

In 1302, a maximize efficiency model examines each possibility and adds a layer of operational parameters (e.g., time to start between machine cycles, cool-off time, work pressure, etc.) to each of the designed operation plans. Multiple options, each having different operational parameters, may be created for each operation plan.

Optionally, the number of options created for each operation plan is determined by a measure of efficiency. In some cases, there may be a single option (the leading option having the best efficiency) while in other cases there may be multiple options. For example, the number of options may be the difference between the leading option having the best efficiency and the option with 10% less efficiency. For example, if the leading option consumes 100 KW, the option with 10% less efficiency consumes 110 KW and all the options between 100 KW to 110 KW are generated.

The maximize efficiency model goes over each possibility and examines at least three different scenarios: relatively steady production needs, rapidly increasing production needs, and rapidly decreasing production needs. The relatively steady/increase/decrease rates and their distribution in time are pre-calculated based on previous history of fluctuations in production needs. Each scenario is given a weight according to its distribution in time (e.g., relatively steady gets 90% and the other plans gets 5% each) and an energy consumption level. In total, the output of each plan is the energy consumption for the next specified number minutes. In each scenario, the maximize efficiency model checks if without any changes in operational parameters the machines in the operation plan are capable of meeting production needs. Each machine has a respective operational parameter function (e.g., how much power does it takes to raise pressure on machine B by 0.5 Bar). If the machines are not capable of meeting production needs at current parameter levels, the model iteratively raises/lowers operational parameter in each of these functions to progress towards the goal of minimizing energy consumption by the peripheral machines (under the assumptions that changing a parameter in machine A does not change energy consumption in machine B). In some scenarios, there are not enough machines to meet the production needs, in which case the plan is canceled.

In 1303, the operation plan options are tested against the non-leading KPIs objectives (which are listed by priority and weights). If an operation plan meets more non-leading KPI objectives (in terms of priority and weights) than the other operation plans, then it is selected as the best option.

The maximize non-leading KPIs model works similarly to the maximize efficiency model. The maximize non-leading KPIs model analyzes how to change respective control settings for each operating parameter towards non-KPI goals, while still being capable of meeting production needs and not reducing efficiency by more than a predefined amount (say x %). For example, consider the case where only machine A or machine B needs to be run, and machine B is 2% less efficient than machine A and x is maximum 5%. The maximize non-leading KPIs model may suggest to run machine B when there is a big gap in work hours balancing, in order to prevent expensive maintenance and/or malfunctions.

The output from the maximize non-leading KPIs model is a single best operation plan with all the operation parameters. A plan parser takes the output of the maximize non-leading KPIs model, and creates actual immediate commands and rules for the next specified period of operation (e.g. a specified number of minutes). These commands and rules are sent to the smart devices and from there to the peripheral machines, and optionally to sensors.

For example, the output of the plan parser may be:
Steady state—Machine A should work in pressure 8.0 and machine B should be in standby with delay-start of 60 sec.
Increasing production needs—Raise machine A pressure to 8.5, activate machine B on 7.5 with delay-off of 240 sec.
Decreasing production needs—lower machine A pressure to 7.2, change delay-start to 360 sec This set of rules and cases are passed to the Operation plan executor.

In 1304, the operation plan executor is triggered to execute the plan output by the plan parser.

The embodiments described above are directed towards controlling peripheral machines in a manufacturing facility. It is envisaged that a similar control solution may be applied to other types of facilities and operations, which use peripheral machines to supply energy to demand units, which utilize this energy. Examples of embodiments of the above described method and system for controlling peripheral machines in non-manufacturing facilities include but are not limited to:

Supplying compressed air to hospitals, workshops and other non-factory buildings that require compressed air;
Supplying cool/hot water to buildings from chillers;
Assembly lines; and
Any other implementation that uses energy-supplying peripheral machines or a combination thereof in order to supply energy to a non-manufacturing facility. For example, air compressors, electric generators and chillers may together supply energy to: quarrying operations, mining operations, construction sites, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant peripheral machines, manufacturing machines, manufacturing facilities, sensors and models will be developed and the scope of the terms peripheral machine, manufacturing machine, manufacturing facility, sensor and model are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first, indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for managing an optimization of energy efficiency of peripheral machines in a manufacturing facility, comprising:
    monitoring and measuring a plurality of peripheral machines through a plurality of sensors external to said plurality of peripheral machines, said peripheral machines providing operation energy to a plurality of industrial machines of a manufacturing facility;
    determining an operating efficiency of the peripheral machines through analysis of an outcome of said measuring;
    receiving from a general system of the manufacturing facility at least one real-time production line need;
    generating an optimized operation plan and predicting maintenance of said plurality of peripheral machines according to said determining and said at least one real-time need;
    generating at least one indication indicative of at least one of:
        malfunction within said manufacturing facility, and
        a waste of energy within said manufacturing facility; and
    providing at least one recommendation for a possible fix.

2. The method of claim 1, wherein said generating an optimized operation plan and predicting maintenance of said plurality of peripheral machines comprising:
    predicting output needs of a production line in at least one of real-time and a predetermined time interval, using a recurrent neural network model of The Long Short-Term Memory network;
    calculating an efficiency of each connected peripheral machine and a total efficiency of the production line, taking into account non-direct parameters; and
    in response to a change of a predetermined threshold in said efficiency, re-iterating said generating of said optimized operation plan.

3. The method of claim 1, wherein said generating an optimized operation plan and predicting maintenance of said plurality of peripheral machines comprising optimizing non-leading other Key Performance Indicators (KPIs) parameters as long as leading KPIs are not affected, using a neural network model with predefined values for weights and suggesting changes of parameters of said plurality of monitored peripheral machines.

4. The method of claim 1, wherein said generating an optimized operation plan and predicting maintenance of said plurality of peripheral machines comprising:
    predicting malfunctions of at least one of said plurality of monitored peripheral machines in real-time, using a recurrent neural network model with Long Short Term Memory network; and
    in response to said predicted malfunctions, triggering a re-evaluation plan based on upcoming machine malfunctions.

5. The method of claim 1 further comprising predicting unmonitored peripheral machines behavior for a predetermined time as a function of time and needed output level;
    wherein the generating an optimized operation plan and predicting maintenance of said plurality of peripheral machines is further conducted according the prediction of said unmonitored peripheral machines behavior.

6. The method of claim 1, wherein said generating said optimized operation plan of said plurality of peripheral machines is further conducted according to non-leading KPIs and upcoming malfunctions.

7. The method of claim 1 further comprising generating an execution plan for an object set of set plurality of peripheral machines and executing the plan by transmitting a set of commands and rules to smart devices associated with said plurality of peripheral machines.

8. The method of claim 1, wherein said operation energy comprises mechanical energy.

9. The method of claim 1, wherein said operation energy comprises electrical energy.

10. The method of claim 1, wherein said operation energy comprises mechanical energy and electrical energy.

11. The method of claim 1, wherein at least one of said plurality of sensors monitors a metric of a conduit connected to an output of a respective peripheral machine.

12. The method of claim 1, wherein said peripheral machines comprise at least one of: an air compressor, a chiller, a vacuum pump, a filter, a dryer, a heater and an electric generator.

13. A system for managing an optimization of energy efficiency of peripheral machines in a manufacturing facility, comprising:
    a plurality of sensors located to monitor metrics of respective peripheral machine, wherein said metrics are indicative of energy transfer from said peripheral machines to a plurality of manufacturing units in said manufacturing facility, said plurality of sensors are located externally to said peripheral machines;
    at least one network interface adapted to communicate with said sensors and controllable ones of said peripheral machines; and at least one processor associated with said plurality of sensors and said at least one network interface, adapted to:

monitor and measure said peripheral machines through said plurality of sensors;

determine an efficiency of the peripheral machines through analysis of an outcome of said measuring; and generate an optimized operation plan and predicting maintenance of said plurality of peripheral machines according to said determining.

14. The system of claim 13 further comprising at least one add-on smart device added to at least one of said peripheral machines and configured to:

sample data provided by respective ones of said plurality of sensors;

store the data in a cloud when internet is available;

communicate in a two-way communications with a respective peripheral machine, for receiving data from the peripheral machine and inserting commands to the peripheral machine;

communicate with other add-on smart devices located on other ones of said peripheral machines and creating a network of smart devices for offline mode communications, when internet is not available, and allow operation between peripheral machines on a local network of smart devices; and make a locally optimal operation of a respective peripheral device when internet is not connected.

15. The system of claim 13, wherein said at least one processor is further adapted to:

run a plurality of models inputted with outcomes of said measurements to identify an effective operation of said peripheral machines and produce a set of instructions sent to be executed to adjust an operation of a respective peripheral machine according to said effective operation.

16. The system of claim 13, wherein said at least one processor is further adapted to:

predict output needs of a production line in at least one of real-time and a predetermined time interval, using a recurrent neural network model of The Long Short-Term Memory network;

calculate an efficiency of each connected peripheral machine and a total efficiency of the production line, taking into account non-direct parameters; and in response to a change of a predetermined threshold in said efficiency, re-generate said optimized operation plan.

17. The system of claim 13, wherein said energy comprises mechanical energy.

18. The system of claim 13, wherein said energy comprises electrical energy.

19. The system of claim 13, wherein said energy comprises mechanical energy and electrical energy.

20. The system of claim 13, wherein at least one of said plurality of sensors monitors a metric of a conduit connected to an output of a respective peripheral machine and wherein said peripheral machines comprise at least one of: an air compressor, a chiller, a vacuum pump, a filter, a dryer, a heater and an electric generator.

* * * * *